US010926781B2

(12) United States Patent
Fisk et al.

(10) Patent No.: US 10,926,781 B2
(45) Date of Patent: Feb. 23, 2021

(54) SUPPORT FRAMES AND RAIL CARS FOR CONVEYING BULK MATERIALS ON A RAIL TRANSPORT SYSTEM

(71) Applicant: RAIL-VEYOR TECHNOLOGIES GLOBAL INC., Lively (CA)

(72) Inventors: James Everrett Fisk, Antioch, IL (US); Patrick Walter Joseph Fantin, Hanmer (CA); William John McCall, Garson (CA); David Wilhelm Niemeyer, Val Caron (CA); Curtis Ron Reay, Hanmer (CA); Eric Benjamin Alexander Zanetti, Sudbury (CA); Esko Johannes Hellberg, Lively (CA)

(73) Assignee: Rail-Veyor Technologies Global Inc., Lively (CA)

( * ) Notice: Subject to any disclaimer, the term of this patent is extended or adjusted under 35 U.S.C. 154(b) by 0 days.

(21) Appl. No.: 15/399,589

(22) Filed: Jan. 5, 2017

(65) Prior Publication Data
US 2017/0320505 A1    Nov. 9, 2017

Related U.S. Application Data

(63) Continuation of application No. PCT/CA2015/050255, filed on Mar. 31, 2015.
(Continued)

(51) Int. Cl.
*B61B 13/12* (2006.01)
*B61L 27/04* (2006.01)
(Continued)

(52) U.S. Cl.
CPC .............. *B61B 13/127* (2013.01); *B61D 9/08* (2013.01); *B61D 9/14* (2013.01); *B61F 1/12* (2013.01);
(Continued)

(58) Field of Classification Search
CPC .......... B61B 13/127; B61D 3/00; B61D 9/08; B61D 9/14; B61F 1/12; B61G 1/00;
(Continued)

(56) References Cited

U.S. PATENT DOCUMENTS 985,361  A * 2/1911 McCauley ................ B61F 1/00
                                                        105/415
1,016,570 A * 2/1912 Lawton .................... B61D 9/14
                                                        414/384
(Continued)

*Primary Examiner* — Mark T Le

(57) ABSTRACT

Support frames and rail cars include first and second side drive plates, first and second cross members connecting the respective ends of the side drive plates, third and fourth cross members connecting the side drive plates at a select distance from the first and second cross members, a coupling assembly situated at the first cross member and adapted to connect another rail car thereto, and first and second diagonal support members connected to the first cross member at an angle sufficient to substantially direct forces from the coupling assembly to the third cross member and side drive plates. The support frames and rail cars may be used for conveying bulk materials on a rail transport system.

20 Claims, 27 Drawing Sheets

Related U.S. Application Data

(60) Provisional application No. 62/021,905, filed on Jul. 8, 2014.

(51) Int. Cl.

| | | |
|---|---|---|
| *B61L 25/02* | (2006.01) | |
| *B61L 25/04* | (2006.01) | |
| *B61D 9/14* | (2006.01) | |
| *B61G 1/00* | (2006.01) | |
| *B61D 9/08* | (2006.01) | |
| *B61G 3/22* | (2006.01) | |
| *B65G 17/12* | (2006.01) | |
| *B61F 1/12* | (2006.01) | |
| *B61G 3/00* | (2006.01) | |
| *G05D 13/62* | (2006.01) | |
| *B61D 3/00* | (2006.01) | |

(52) U.S. Cl.
CPC ............... *B61G 1/00* (2013.01); *B61G 3/00* (2013.01); *B61G 3/22* (2013.01); *B61L 25/02* (2013.01); *B61L 25/021* (2013.01); *B61L 25/023* (2013.01); *B61L 25/025* (2013.01); *B61L 25/04* (2013.01); *B61L 25/048* (2013.01); *B61L 27/04* (2013.01); *B65G 17/123* (2013.01); *G05D 13/62* (2013.01); *B61D 3/00* (2013.01); *B65G 2201/04* (2013.01); *B65G 2812/0299* (2013.01); *B65G 2814/0364* (2013.01)

(58) Field of Classification Search
CPC .. B61G 3/00; B61G 3/22; B61L 25/02; B61L 25/021; B61L 25/023; B61L 25/025; B61L 25/04; B61L 25/048; B61L 27/04; B65G 17/123; B65G 2201/04; B65G 2812/0299; B65G 2814/0364; G05D 13/62

USPC .............................. 105/413, 415, 417, 421

See application file for complete search history.

(56) References Cited

U.S. PATENT DOCUMENTS

| | | | | |
|---|---|---|---|---|
| 1,678,323 | A * | 7/1928 | Bruce | B61F 1/00 105/236 |
| 2,707,443 | A * | 5/1955 | Pope | F26B 15/16 105/160.5 |
| 4,911,507 | A * | 3/1990 | Leist | A47B 53/02 312/201 |
| 6,416,143 | B1 * | 7/2002 | Janson | A47B 53/02 312/201 |
| 6,681,702 | B1 * | 1/2004 | Nicely | A47B 53/02 105/157.1 |
| 2003/0226470 | A1 * | 12/2003 | Dibble | B61B 13/127 105/96 |

* cited by examiner

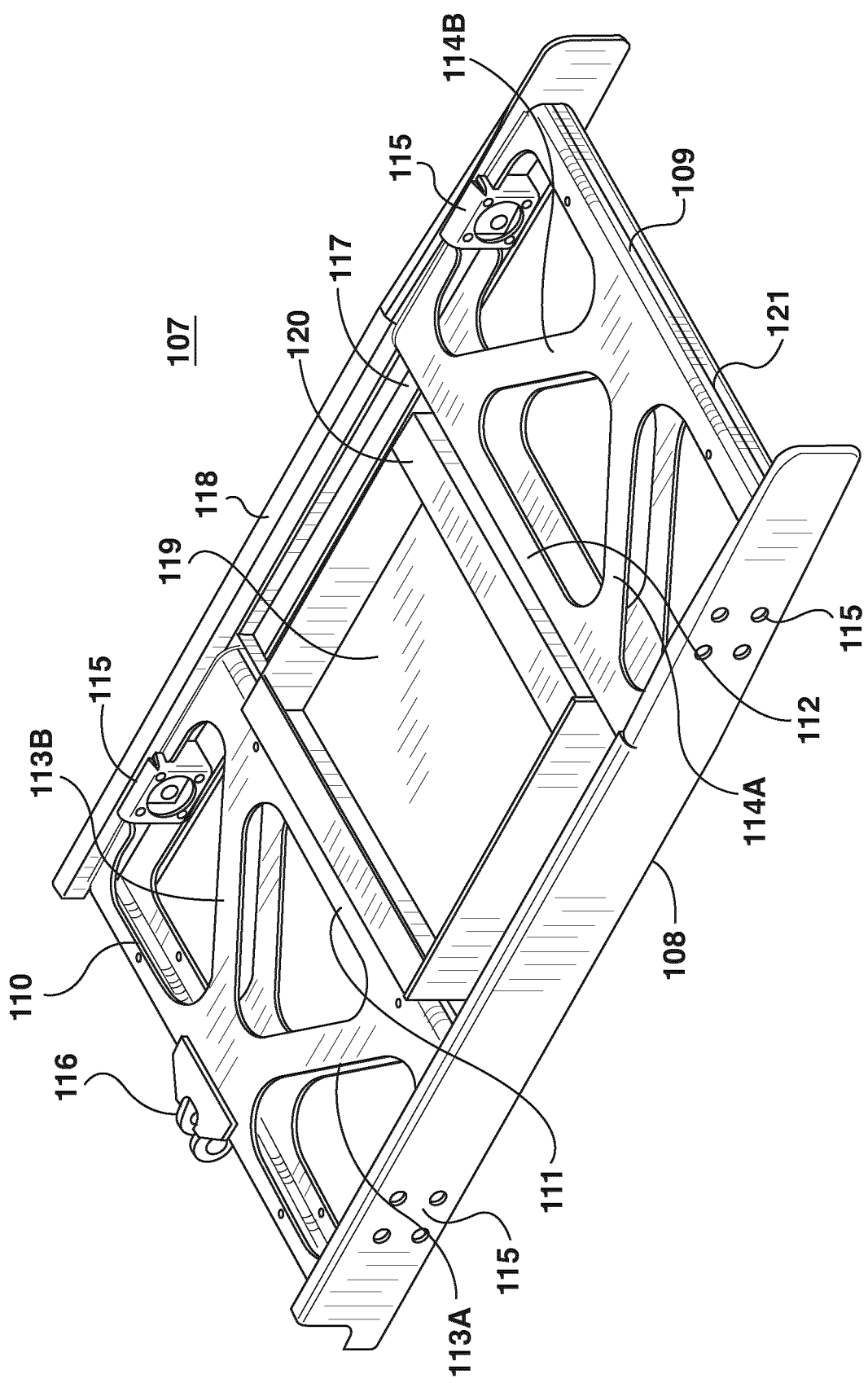

SUPPORT FRAMES AND RAIL CARS FOR CONVEYING BULK MATERIALS ON A RAIL TRANSPORT SYSTEM

CROSS REFERENCE TO RELATED APPLICATIONS

This application is a continuation of PCT application Serial Number PCT/CA2015/050255 filed Mar. 31, 2015, entitled SUPPORT FRAMES AND RAIL CARS FOR CONVEYING BULK MATERIALS ON A RAIL TRANSPORT SYSTEM, which claims the benefit of priority of U.S. provisional patent application Ser. No. 62/021,905, filed Jul. 8, 2014, the content of both of which are incorporated by reference in their entirety.

FIELD OF THE INVENTION

The present invention generally relates to support frames and rail cars for conveying bulk materials on a rail transport system. More specifically, the present invention relates to support frames for rail cars, and to rail cars, for use with a rail transport system for conveying bulk materials having no internal drive.

BACKGROUND OF THE INVENTION

Methods and arrangements for moving bulk materials in conventional trains, trucks, conveyor belts, aerial tramways or as a slurry in a pipeline are well known and are typically used in various industries because of site-specific needs or experience. In the minerals and aggregate industries, for example, bulk materials are moved from mining or extraction sites to a process facility for upgrading or sizing. Trucks had been the system of choice for many years for moving bulk materials. Trucks were enlarged for off-road vehicles because of their efficient transport of bulk materials and increased capacity. These vehicles, however, are limited to site specific applications and are provided at a high capital cost. Major off-road trucks have evolved that require very wide roadways for passing each other, are not energy efficient per ton-mile of material transported, have limited hill climbing ability, and are dangerous because of potential of operator error as well as being environmentally unpleasant neighbors.

Trains have been used for many years for bulk material transport in hopper cars. Because of low friction and the use of free rolling iron or steel wheels on steel tracks, they are very efficient users of energy but are limited in capacity relative to the drivers or locomotives required. Large tonnage long trains use multiple drivers that are heavy units, which dictate the weight of rail and ballast requirements. All railroads must be designed for the weight of the drivers or locomotives including fuel, not the combination of car plus loads, which are significantly less. The drivers need to be of sufficient weight so that the rotary drive tire makes contact with the stationary rail and must have sufficient friction to produce forward or reverse movement of what will include heavily loaded cars. The inclination capable of conventional railroad systems is limited to the friction between the weighted drive wheels and track. Rail cars are individual units that each has to be loaded in a batch process, one car at a time. Bulk materials can be unloaded from hopper cars by opening bottom dump hatches or can be individually rotated to dump out of the top. Spotting cars for both loading and unloading is time consuming and labor intensive.

Although moving from one location to another may be cost effective, the added cost of batch loading and unloading stages in shorter distance transports reduces the rail transport cost effectiveness. With normal single dual track train systems only one train can be used on a system at a time.

Conveyor belts have been used for many years to move bulk materials. A wide variety of conveyor belt systems exist that can move practically every conceivable bulk material. Very long distance single belt runs are very capital cost intensive and are subject to catastrophic failure when a belt tears or rips, typically shutting down the entire system and dumping the carried load, requiring cleanup. Conveyor belts are relatively energy efficient but can require high maintenance because of an inherent problem of multiple idler bearings requiring constant checking and replacement. Short distance conveyor belts are commonly used in dry or clamp transport of almost all types of materials. Because conveyor belts are very flexible and desirably operated over fairly flat terrain, they are not efficient at transporting moderately high solids slurry where water and fines can accumulate in low spots and spill over the side creating wet spilled slurry handling problems.

Some bulk materials can be transported in pipelines when mixed with water to form slurry that is pushed or pulled with a motor driven pump impeller in an airless or flooded environment. The size of the individual particles that are present in the bulk materials dictates the transport speed necessary to maintain movement. For example, if large particles are present then the velocity must be high enough to maintain movement by saltation or skidding along the bottom of the pipe of the very largest particles. Because pipelines operate in a dynamic environment, friction is created with the stationary pipe wall by a moving fluid and solid mass. The higher the speed of the moving mass the higher the friction loss at the wall surface requiring increased energy to compensate. Depending on the application, the bulk material has to be diluted with water initially to facilitate transport and dewatering at the discharge end.

Light rail, narrow gage railroads for transporting bulk material from mines and the like is known as described by way of example with reference to U.S. Pat. No. 3,332,535 to Hubert et al. wherein a light rail train made up of several cars is propelled by drive wheels and electric motors combinations, dumping over an outside loop. By way of further example, U.S. Pat. No. 3,752,334 to Robinson, Jr. et al. discloses a similar narrow gage railroad wherein the cars are driven by an electric motor and drive wheels. U.S. Pat. No. 3,039,402 to Richardson describes a method of moving railroad cars using a stationary friction drive tire.

While the above described transport systems and methods have specific advantages over conventional systems, each is highly dependent upon a specific application. It has become apparent that increases in labor, energy and material costs plus environmental concerns that alternate transport methods need to be applied that are energy and labor efficient, quiet, non-polluting, and esthetically unobtrusive. US Patent Publications US 2003/0226470 to Dibble et al. for "Rail Transport System for Bulk Materials", US 2006/0162608 to Dibble for "Light Rail Transport System for Bulk Materials", and U.S. Pat. No. 8,140,202 to Dibble describe a light rail train utilizing an open semi-circular trough train with drive stations, the disclosures of which are herein incorporated by reference in their entirety. Such a light rail system offers an innovative alternative to the above mentioned material transport systems and provides for the transport of bulk materials using a plurality of connected cars open at each end except for the first and last cars, which have end plates. The train forms a long open trough and has a flexible flap attached to each car and overlapping the car in front to prevent spillage during movement. The lead car has four wheels and tapered side drive plates in the front of the car to facilitate entry into the drive stations. The cars that follow have two wheels with a clevis hitch connecting the front to the rear of the car immediately forward. Movement of the train is provided by a series of appropriately placed drive stations having drive motors on either side of the track which are AC electric motors with drive means such as tires to provide frictional contact with the side drive plates. At each drive station, each drive motor is connected to an AC inverter and controller for drive control, with both voltage and frequency being modified as needed. The electric motors each turn a tire in a horizontal plane that physically contacts two parallel side drive plates external of the wheels of each car. Pressure on the side drive plates by these drive tires converts the rotary motion of the tires into horizontal thrust. The wheels on the cars are spaced to allow operation in an inverted position by use of a double set of rails to allow the cars to hang upside down for unloading. By rotating this double track system the unit train can be returned to its normal operating condition. Such a system is well known and commercially referred to as the Rail-Veyor™ material handling system.

Flanged wheels may be symmetrical to the side drive plates allowing operation in an inverted position which, when four rails are used to encapsulate the wheel outside loop discharge of the bulk material is possible. By using elevated rails, the train can operate in the inverted position as easily as in the convention manner.

Yet further, drives for such light rail systems have been developed as described in U.S. Pat. No. 5,067,413 to Kiuchi et al. describing a device for conveying travelable bodies which are provided no driving source, on a fixed path. A plurality of travelable bodies travels on the fixed path while aligned substantially in close contact with each other. Traveling power is transmitted to one of a plurality of travelable bodies which is positioned on at least one end of the alignment. The traveling power drives the travelable body with frictional force while pressing one side surface of the travelable body, and is transmitted to the travelable body while backing up the other side surface of the travelable body. A device to transmit traveling power is arranged on only a part of the fixed path.

Rail transport systems typically impart substantial force and strain on rail cars and rail car support frames during operation, which may lead to use of heavy support structures, reduced lifespan of the rail cars, reduced efficiency and/or increased maintenance and upkeep costs.

While light rail systems such as the Rail-Veyor™ material handling system described above are generally accepted, an alternative, additional, and/or improved rail car support frame and/or rail car for conveying bulk materials on a rail transport system is desirable.

SUMMARY OF THE INVENTION

The present invention provides support frames and rail cars for conveying bulk materials on a rail transport system as well as a rail transport system comprising rail cars as disclosed herein. The present invention further provides frames and rail cars for use with a rail transport system for conveying bulk materials having no internal drive.

In one embodiment, the present invention provides for a support frame for a rail car for conveying bulk materials on a rail, said support frame comprising:

a first side drive plate having a first end and a second end;

a second side drive plate having a first end and a second end;

a first cross member connecting the first and second side drive plates at or near their respective first ends;

a second cross member connecting the first and second side drive plates at or near their respective second ends;

a third cross member connecting the first and second side drive plates, the third cross member being spaced a first distance from the first cross member;

a fourth cross member connecting the first and second side drive plates, the fourth cross member being spaced a second distance from the second cross member;

a coupling assembly for attachment to a subsequent rail car, said coupling assembly positioned at the first cross member and adapted for connecting the subsequent rail car thereto; and a first diagonal support member and a second diagonal support member, each extending from the first cross member at a location near the coupling assembly to the third cross member, such that the first and second diagonal support members are connected to the first cross member at an angle sufficient to substantially direct forces from the coupling assembly to the third cross member and the first and second side drive plates;

wherein each side drive plate optionally includes a surface adapted for frictionally contacting one or more drive tires and accommodating forces associated therewith such that drive tire driven moment is imparted to the side drive plate.

In another embodiment of the support frame or support frames as outlined above, the support frame is for a rail car operable in a rail transport system including at least one drive station comprising the one or more drive tires, the one or more drive tires being adapted to impart a driven moment to the rail car.

In another embodiment of the support frame or support frames as outlined above, the support frame further comprises a second coupling assembly positioned at the second cross member and adapted to connect another rail car thereto.

In another embodiment of the support frame or support frames as outlined above, the support frame further comprises:

a third diagonal support member and a fourth diagonal support member, each extending from the second cross member at a location near the second connector assembly to the fourth cross member, such that the third and fourth diagonal support members are connected to the second cross member at an angle sufficient to substantially direct forces from the second coupling assembly to the fourth cross member and the first and second side drive plates.

In another embodiment of the support frame or support frames as outlined above, the coupling assembly is a single point connection.

In another embodiment of the support frame or support frames as outlined above, the coupling assembly is a clevis type coupling.

In another embodiment of the support frame or support frames as outlined above, the coupling assembly includes parallel blades, each blade forming an aperture therethrough, wherein the parallel blades are further adapted to accommodate compressible spacers and an inner race secured with rigid spacers to provide space and form a joint for rotation thereof.

In another embodiment of the support frame or support frames as outlined above, the coupling assembly includes parallel blades, each blade forming an aperture therethrough, wherein the parallel blades are further adapted for accommodating a complementary blade from a compatible coupling assembly of the subsequent rail car therebetween.

In another embodiment of the support frame or support frames as outlined above, the complementary blade includes a spherical bearing and rigid spacers for extending between the spherical bearing and each parallel blade, and wherein the coupling assembly is adapted to accommodate a pin extending through the complementary and parallel blade apertures to form a joint.

In another embodiment of the support frame or support frames as outlined above, the support frame further includes wheel mounting structures connected to each of the side plates.

In another embodiment of the support frame or support frames as outlined above, the wheel mounting structures are connected to a surface of the side plate which does not frictionally contact the drive tire.

In another embodiment of the support frame or support frames as outlined above, the wheel mounting structures are adapted to accommodate a wheel hub type assembly.

In another embodiment of the support frame or support frames as outlined above, the wheel hub type assembly includes a bearing having a self-contained assembly.

In another embodiment of the support frame or support frames as outlined above, the wheel hub type assembly includes a bearing having a tapered roller bearing.

In another embodiment of the support frame or support frames as outlined above, one wheel hub type assembly rotates an associated wheel independently from another wheel at another wheel hub assembly.

In another embodiment of the support frame or support frames as outlined above, an area is formed and bounded by the first side drive plate, the second side drive plate, the third cross member and the fourth cross member, and wherein the formed area is adapted to accommodate passing of a curved rail thereby allowing for a tight vertical turn radius by the rail car.

In another embodiment of the support frame or support frames as outlined above, the first diagonal support member and the second diagonal support member each extend from the first cross member at an angle of about 45°.

In another embodiment of the support frame or support frames as outlined above, the first cross member is integral with the first and second diagonal support members.

In another embodiment of the support frame or support frames as outlined above, the first and third cross members are integral with the first and second diagonal support members.

In another embodiment of the support frame or support frames as outlined above, at least a portion of the support frame is formed from upper and lower sheets having cut out sections.

In a further embodiment, the present invention provides for a rail car, operable in a rail transport system including at least one drive station having a drive tire adapted to impart a driven moment to the rail car for conveying bulk materials on a rail, the rail car comprising a support frame such as those as outlined above and a container for bulk materials connected to the support frame.

In another embodiment of the rail car or rails cars outlined above, the container for bulk materials is in the form of a trough.

In another embodiment of the rail car or rails cars outlined above, the container for bulk materials is in the form of a substantially continuous trough, and wherein the container for bulk materials comprises a chute projecting from one end, the chute being configured for overlapping with a trough of a subsequent rail car to prevent spillage therebetween.

In another embodiment of the rail car or rails cars outlined above, the container for bulk materials is hingedly joined to the support frame to allow for side-dumping of bulk materials from the rail car.

In another embodiment of the rail car or rails cars outlined above, the container further comprises a guide portion for pivoting the container into a dumping position upon contact with a counterpart rail, ridge, or channel of the rail transport system.

In yet a further embodiment, the present invention provides for a train, comprising front and rear rail cars, and optionally one or more intermediate rail cars coupled therebetween, wherein the rail cars are rail cars as outlined above.

In another embodiment of the train or trains as outlined above, at least two of the containers for bulk materials of the rail cars of the train form a substantially continuous trough.

In another embodiment of the train or trains as outlined above, the at least two containers for bulk materials forming the substantially continuous trough each comprise a chute projecting from one end, the chute being configured for overlapping with a trough of a subsequent rail car to prevent spillage therebetween.

DETAILED DESCRIPTION

The present invention will now be described more fully hereinafter with reference to the accompanying drawings, in which illustrative embodiments of the invention are shown. This invention may, however, be embodied in many different forms and should not be construed as limited to the embodiments and examples set forth herein nor should the invention be limited to the dimensions set forth herein. Rather, the embodiments herein presented are provided so that this disclosure will be thorough and complete, and will fully convey the scope of the invention to those skilled in the art by way of these illustrative and non-limiting embodiments and examples. It will be understood to the person of skill in the art that many different forms and variations of the embodiments, examples and illustrations provided herein may be possible, and the various embodiments, examples, and illustrations provided herein should be construed as non-limiting embodiments, examples, and illustrations.

Figure 1:
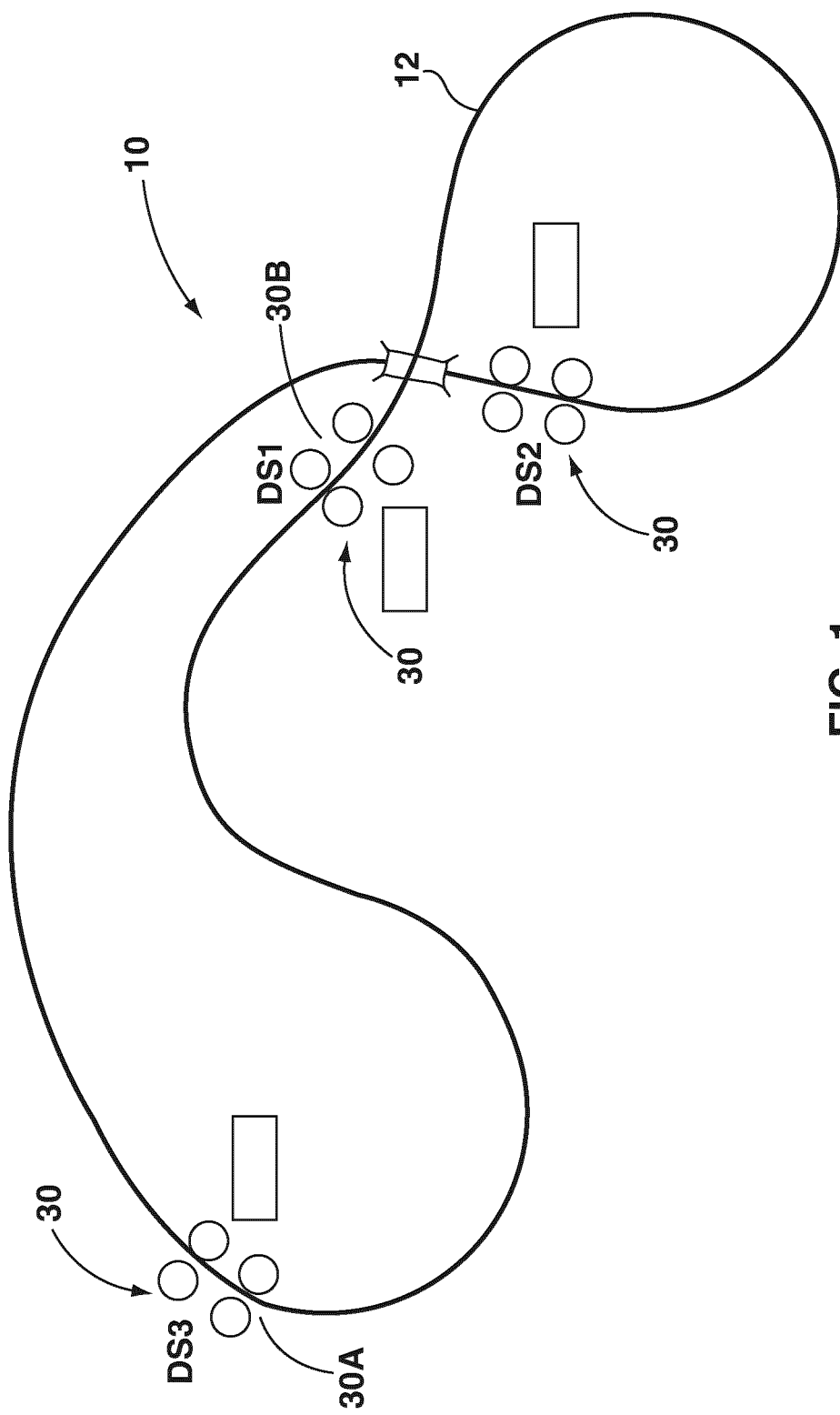
FIG. 1 is a diagrammatical illustration of an embodiment of a rail transport system for transporting bulk materials.
Figure 2:
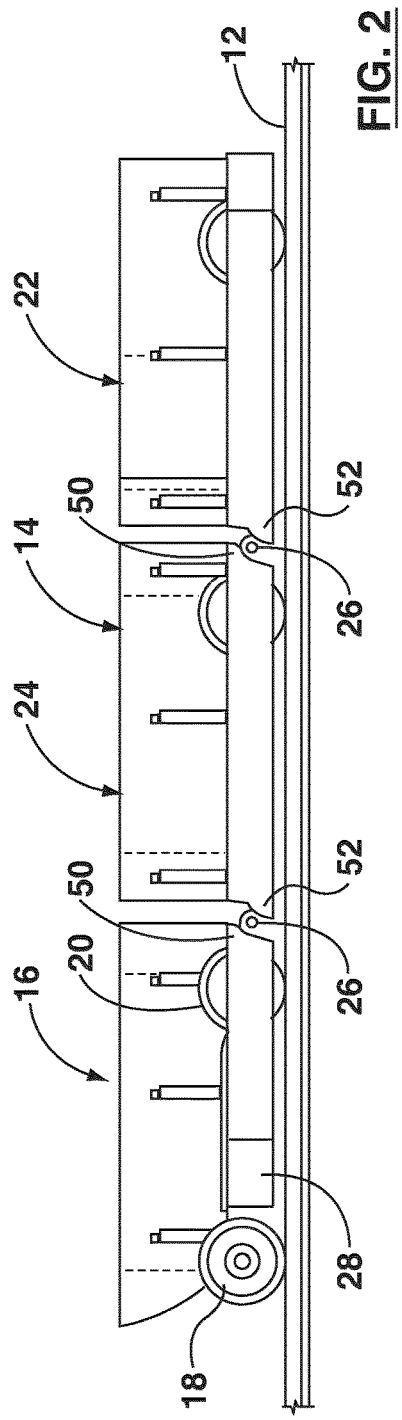
FIG. 2 is a side view of one embodiment of a train, comprising rail cars, operable with the rail transport system of FIG. 1.
Figure 3:
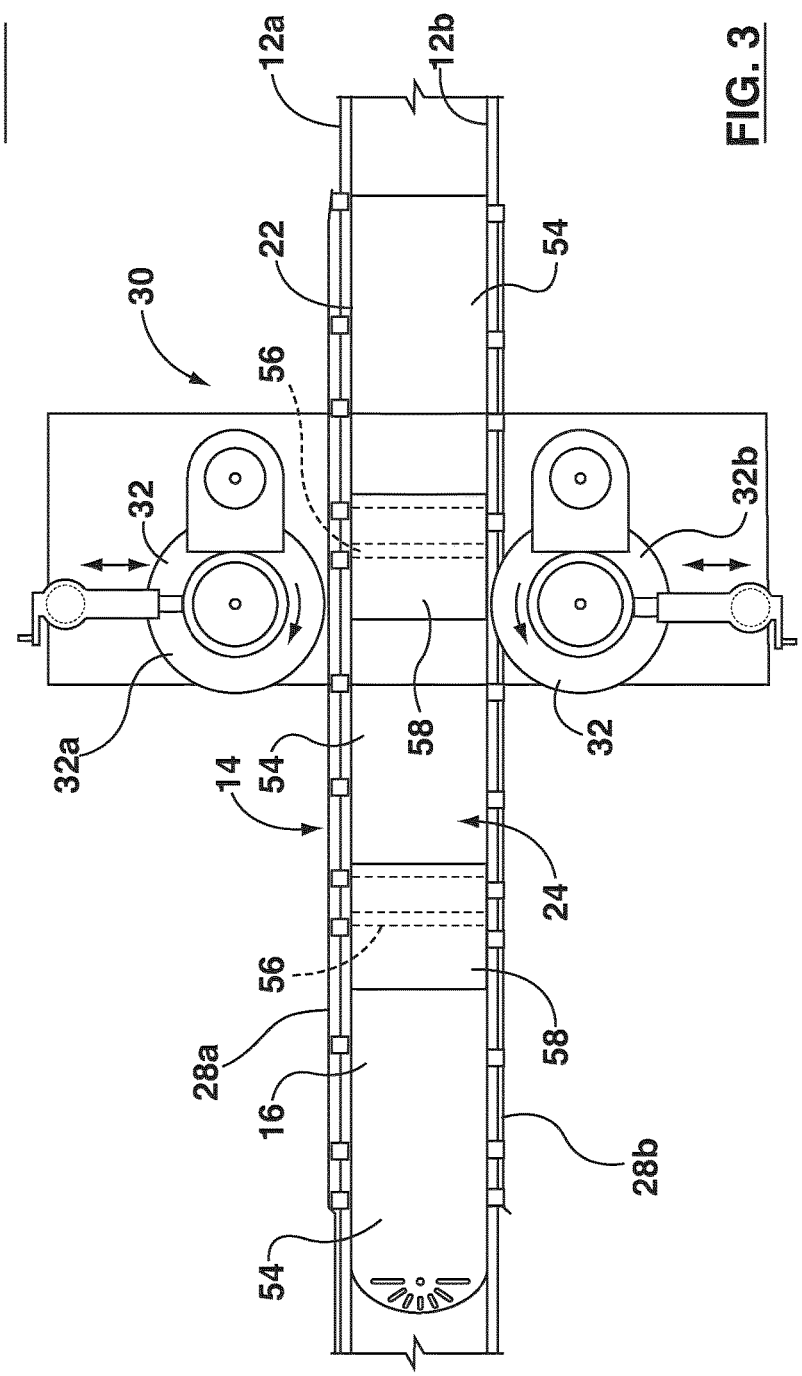
FIG. 3 is a top plan view of one embodiment of a train, comprising rail cars, operable with the rail transport system of FIG. 1 (an example of a drive station is visible)

With reference initially to FIGS. 1-3, one train and rail transport system 10, in keeping with the teachings of the present invention, comprises a track 12 having parallel rails 12a, 12b. A train 14 includes a first, front, or lead car 16 having both forward and rear wheel pairs 18, 20 operable on the track 12 for providing a free wheeling movement to the lead car. For the embodiment herein described by way of example, the train includes additional cars described as a second or rear car 22 and an intermediate or middle rail car 24 or multiple intermediate or middle rails cars, carried between the lead and rear cars. The rear and intermediate cars 22, 24 include a forward pivotal connection or coupling assembly 26 for pivotally connecting the intermediate and rear cars to adjacent forward cars. The rear and intermediate cars 22, 24 have only rear wheel pairs 20 operable on the track 12 for providing a free wheeling movement thereto.

Figure 4:
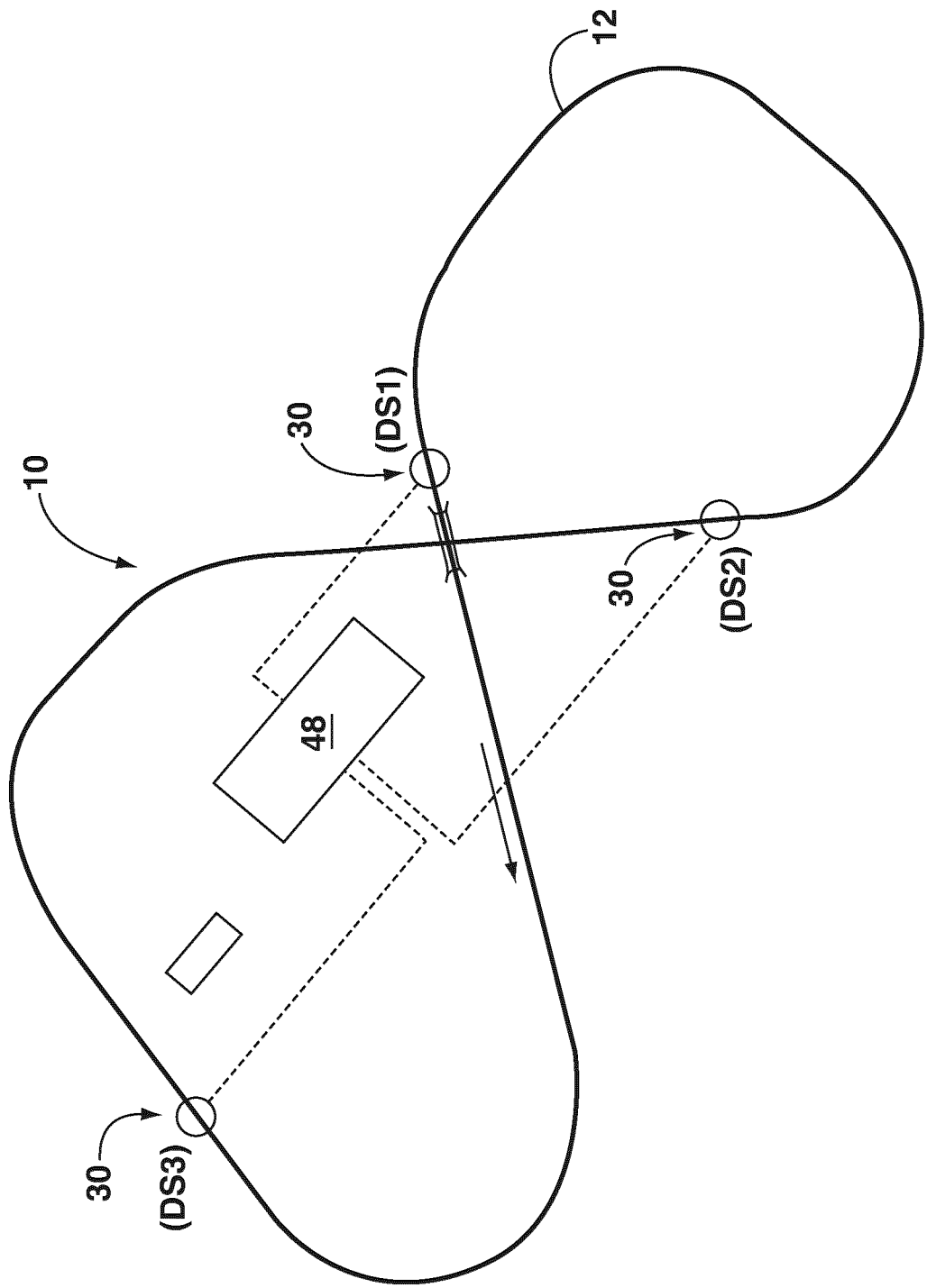
FIG. 4 is a diagrammatical illustration of another embodiment of a rail transport system for transporting bulk materials.

With continued reference to FIG. 2, each of the cars has a side plate 28 affixed thereto. With reference to FIGS. 1 and 3-4, multiple drive stations 30 each have a variable frequency drive (VFD) including a drive tire 32 for frictionally contacting the side plate 28 and imparting a driven moment to each rail car and thus the train 14. As illustrated with continued reference to FIG. 3, the embodiment herein described includes each car having opposing side plates 28a, 28b and opposing drive tires 32a, 32b. Specifically, each car may have a fixed side plate on each side, which runs substantially the length of the car and spaced outside the wheels and tracks. These side plates may be located symmetrically with the wheels and parallel to the light rails. In another arrangement, the side plates may be located asymmetrical with the wheels. However, in this arrangement, the wheels are part of the side plates such that the side plate-wheel arrangement allows the train to be moved either downstream or upstream. The wheels may be placed to allow the train to operate in either an upright or an inverted position. Each drive station 30 includes A/C inverters and a controller connected to every set of drive motors such that the motors may be synchronized through a modifying of at least one of voltage and frequency thereto. Forward or reverse motion of the train is the result of horizontal rotation of tires on opposite sides of the train turning in opposite directions with suitable pressure of said rotation that provides reduced slip between the tire surface and side plates. In other words, the two opposing tires are both pushed inward toward the center of the track. In order the stop the train, the drive tires 32 are further adapted to engage and apply pressure to the side plate 28 of the car.

As herein illustrated, the lead car 16 has a trough 54 and opposing side plates 28a, 28b having a reduced distance between them for smooth entrance into opposing drive tires 32a, 32b of the drive station. The rear car 22 has a trough and opposing side plates 28a, 28b which may be at a reduced distance between them to reduce shock when the train 14 exits the opposing drive tires 32a, 32b of the drive station 30. The intermediate cars 24 coupled to the lead car 16 and the rear car 22 by the clevis type coupling has its trough aligned to produce an overall open trough with gaps 56 between cars. A flexible flap 58 extends over the gap 56 between the cars 16, 24, 22. The cars, each comprise of a semi-circle open trough and when joined or coupled together represents an open and continuous rigid trough for the entire length of the train. A flexible sealing flap attached near the front of the trailing car overlaps but is not attached to the rear of the lead car trough. A semi-circular trough is much better sealed with the flexible flap that other designs such as showed in U.S. Pat. No. 3,752,334. This allows the train to follow the terrain and curves without losing its sealed integrity as a continuous trough. The material to be transported in the train is effectively supported and sealed by this flap as the material weight is equally distributed maintaining the seal against the metal trough of the forward car. The long continuous trough can provide for simplified loading as the train can be loaded and unloaded while moving similar to a conveyor belt. This can be considered an advantage over the batch loading equipment requirements of a conventional railroad hopper or rotary dump car.

FIGS. 5-12 provide illustrative embodiments of support frames for rail cars, and illustrative embodiments of lead, intermediate, and rear rail cars comprising the support frames. The design of the illustrated support frame and rail car embodiments may provide for a reduction of steel used in the system, improved manufacturability and, therefore, a reduction in system component costs. Generally, steel may optionally be bent to form a semi-octagonal trough (see, for example, FIGS. 5D and 5E), which may be used as a container for bulk materials (i.e. any suitable material, product, or substance to be transported from location to another, such as but certainly not limited to coal, minerals, earth, and rock; the skilled person will recognize that many different materials, products, or substances may be transported via rail transport systems as described herein) carried by the rail cars. This may provide for easier and more consistent formation of the trough (as opposed to a semi-circular design). It will be recognized that many other bulk material container shapes and types may be possible and the invention is not limited to semi-circular or semi-octagonal shapes. The support frame (or rail car frame) as may optionally be formed using a laser cut/bent steel plate design instead of a structural member based design as used in traditional systems, although a suitable structural member based design may be possible in certain applications. The skilled person will recognize that many frame-forming approaches and techniques may be possible.

Figure 5A:
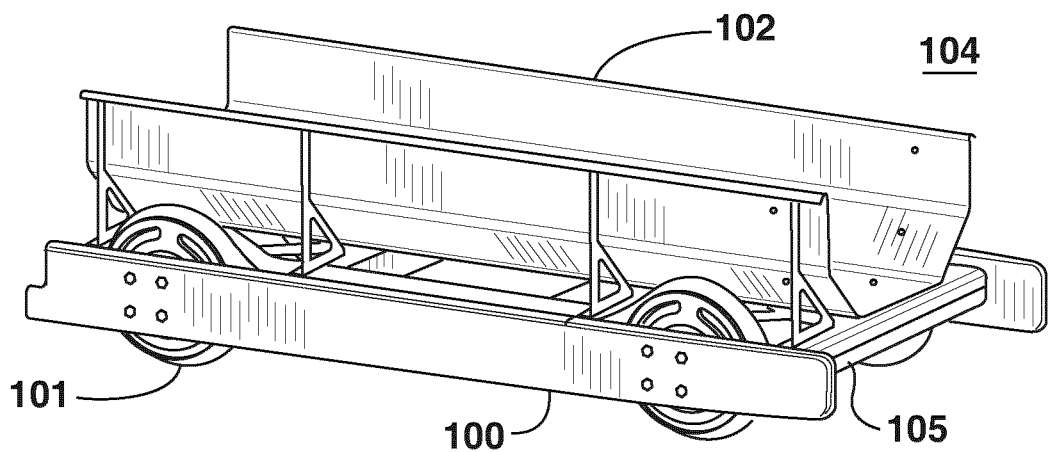
FIG. 5A and FIG. 5B provide perspective views of an embodiment of a front or lead rail car, and FIG. 5C and FIG. 5D provide perspective and bottom views, respectively, of a trough arrangement for a rail car.
Figure 5B:
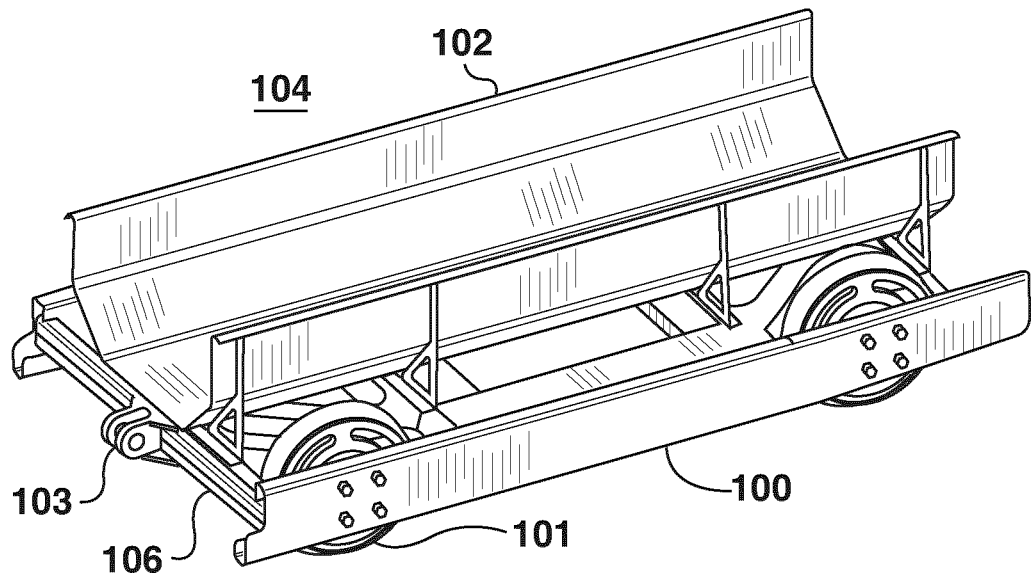
Figure 5C:
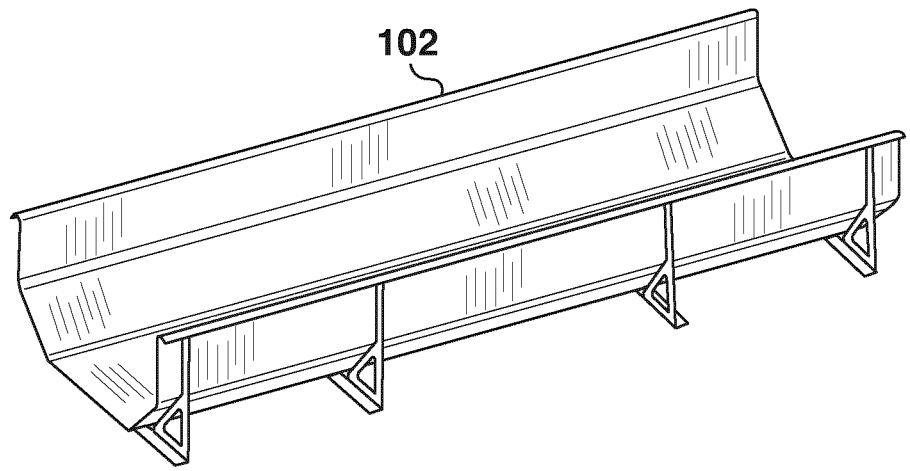
Figure 5D:
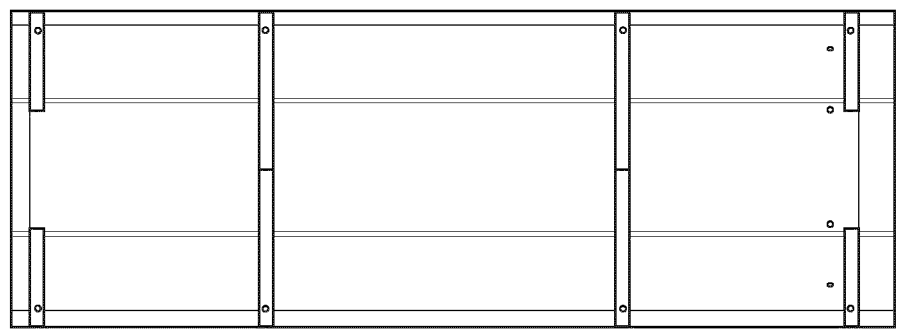

FIG. 5A provides a perspective view of one embodiment of a lead rail car 104. An optional front barrier or end (not shown) may be installed at the front of the rail car to prevent spillage of bulk materials. The rail car 104 comprises a trough-type bulk materials container 102, a wheel and wheel hub assembly 101, and a support frame 100. The lead rail car 104 generally comprises a wheel and wheel hub assembly 101 mounted towards each end of the car 104. The second cross member 105 of the support frame is visible. FIG. 5B shows a second perspective view of the embodiment of a lead rail car shown in FIG. 5A. First cross member 106 is visible, as well as clevis-type coupling assembly 103 attached thereto.

FIG. 6A provides a perspective view of one embodiment of a support frame 107 for a lead rail car. Support frame 107, which is for a rail car operable in a rail transport system including at least one drive station having a drive tire adapted to impart a driven moment to the rail car for conveying bulk materials on a rail, comprises a first side drive plate 108 having a first end and a second end, a second side drive plate 118 having a first end and a second end, a first cross member 110 connecting the first and second side drive plates at or near their respective first ends, a second cross member 109 connecting the first and second side drive plates at or near their respective second ends, a third cross member 111 connecting the first and second side drive plates, the third cross member being spaced a first distance from the first cross member, and a fourth cross member 112 connecting the first and second side drive plates, the fourth cross member being spaced a second distance from the second cross member. The support frame 107 further comprises a coupling assembly 116 for attachment to a subsequent rail car, said coupling assembly positioned at the first cross member and adapted for connecting the subsequent rail car thereto, and a first diagonal support member 113A and a second diagonal support member 113B, each extending from the first cross member at a location near the coupling assembly to the third cross member, such that the first and second diagonal support members are connected to the first cross member at an angle sufficient to substantially direct forces from the coupling assembly 116 to the third cross member and the first and second side drive plates. In the illustrated embodiment, the angle is about 45°. Each side drive plate of the support frame includes a surface adapted for frictionally contacting one or more drive tires and accommodating forces associated therewith such that drive tire driven moment is imparted to the side drive plate. As shown, the side drive plates, cross members and diagonal support members may form a support structure sufficient to carry a trough arrangement for carrying bulk materials.

The first and second diagonal support members may provide an efficient means for distributing/directing stresses from the coupling assembly to the third cross member and the first and second side drive plates. In certain embodiments, this type of arrangement may allow for support frames (and rail cars comprising said support frames) having reduced overall weight, which may contribute to overall system efficiency.

The embodiment illustrated in FIG. 6A provides an example of a support frame in which at least a portion of the support frame may optionally be formed from bent sheets having cut out sections. By way of example, in the illustrated support frame 107, the section comprising the first cross member 110, the third cross member 111, the first diagonal support member 113A, and the second diagonal support member 113B may be formed from an upper and a lower sheet of material (i.e. two sheets of metal) having appropriate sections/apertures which are cut out, or which may subsequently be cut out (using, for example, a laser cutter), and which may each be bent (for example, by using a press brake) on two opposing edges (i.e. the edges which will form the first cross member 110 and the third cross member 111 of the support frame). The two bent edges of each sheet may comprise a bend, angle, or curve portion, followed by a substantially straight portion as shown. The two sheets of material may then be joined (for example, by welding or bolting) along corresponding ends/edges of the substantially straight portions of each sheet, such that the first (i.e. upper) sheet substantially overlaps with the second (i.e. lower) sheet, as shown. In the embodiment illustrated in FIG. 6A, a weld seam 121, where the upper and lower sheets were joined, is shown. The substantially straight portions of the upper and lower sheets can serve to create space between the upper and lower sheets. In the illustrated example, the first diagonal support member 113A and the second diagonal support member 113B each comprise two substantially overlapping diagonal supports, one being part of the first (upper) sheet and one being part of the second (lower) sheet. Similarly, the first cross member 110 and the third cross member 111 may comprise substantially overlapping cross member sections on opposing upper and lower sheets, which are welded or otherwise joined together along the length of the cross member sections. It will be understood that second cross member 109, fourth cross member 112, third diagonal support member 114A, and fourth diagonal support member 114B (described in further detail below) may, in certain embodiments, be similarly formed from upper and lower sheets.

It will be understood that in certain embodiments the upper sheet may have structural cross members and/or diagonal support members which overlap with corresponding structural cross members and/or diagonal support members on the lower sheet. Cross members and diagonal support members may be considered as comprising members from both the upper and lower sheets. The sheets of material may be cut out, such that portions are removed from each sheet to form substantially overlapping apertures, such as the substantially triangular-shaped apertures shown in FIG. 6A. The sheets of material may be cut, using, for example, a laser cutter, either prior to or following bending/braking of the sheets.

Although described above with reference to a front rail car, it will be understood that in certain embodiments, the support frame for a middle and/or rear rail car may optionally be similarly formed.

In the embodiment illustrated in FIG. 6A, the support frame 107 further comprises a third diagonal support member 114A and a fourth diagonal support member 114B, each extending from the second support cross member to the fourth cross member, similarly to diagonal support members 113A and 113B. As well, the support frame 107 may additionally comprise a center rib 117, a box bracket 119, and a box angle 120. In certain embodiments, such a section of the front and/or rear rail cars may be outfitted with ballast weight. In the illustrated example, the center of the rail car may be plated in and filled with concrete to provide ballast weight. Elements for supporting a concrete slab may be provided as shown. Such an approach may facilitate maintaining a substantially constant cross section throughout the train, facilitating a better seal at the loading chute. The ballast weight may serve to prevent or reduce lifting of the wheels of the front and/or rear rail cars when the middle rail cars are loaded with heavy material or cargo during operation. Further, by supporting the ballast weight at the support frame, the front and rear rail cars may comprise troughs and carry materials similarly to the middle rail cars. In this manner, ballast weight does not need to be incorporated into the front and rear rail car troughs themselves, allowing the troughs of the front and rear rail cars to properly engage and seal with the loading chute during loading.

In the illustrated embodiment, support frame 107 comprises four hub mounting brackets 115, to which wheels and wheel hub assemblies may be attached.

The support frame 107 of FIG. 6A is a support frame for a lead or front rail car. This embodiment features four hub mounting brackets for attachment of wheels and wheel hub assemblies (although configurations having fewer or more wheels may also be possible), and a single clevis-type coupling assembly 116 (in this example, a female-type coupling) for coupling the lead rail car to a subsequent rail car having a compatible coupling assembly (in this example, a male-type clevis coupling). It will be understood that although the coupling assembly shown on the rail car is a female-type clevis coupling assembly, other configurations may be possible. For example, the coupling assembly on the rail car may be a male-type clevis coupling assembly, and the subsequent rail car to be joined to the lead rail car may comprise a female-type clevis coupling assembly.

It will be appreciated that several different types and styles of coupling assemblies may be suitable for joining rail cars as described herein to form a train. The skilled person having regard to this specification will be aware of a variety of coupling assemblies suitable for joining rail cars as described herein, depending on the particular application. Suitable coupling assemblies may include a suitable mechanical joint, hinge, ball-and-socket joint, knuckle joint, or other suitable joint. In certain embodiments, coupling assemblies may be single point connections. In certain preferred embodiments, coupling assemblies may be clevis type coupling assemblies. Trains may comprise a plurality of rail cars linked by the same, or a selection of different types of coupling assembles, as is suitable for each particular application.

In certain embodiments, a clevis type coupling assembly may be used in the support frame. The coupling assembly may include parallel blades 130 and 131 (see, for example, female coupling assembly 116 shown in FIG. 6A), wherein each blade forms/comprises an aperture 132 therethrough. In one embodiment, the parallel blades may be adapted to accommodate compressible spacers and an inner race secured with rigid spacers to provide space and form a joint for rotation thereof. In another embodiment, the connection may include a spherical plain bearing for a robust joint therebetween. In certain embodiments, rigid spacers between the inner race of the spherical bearing and the forks/parallel blades of the female clevis fitting may be used. In certain embodiments, a compressible element may not be required in this arrangement. This may allow for a reduced looseness at the coupling. In yet another embodiment, each parallel blade having an aperture therethrough may be further adapted for accommodating a complementary blade (i.e. a male-type clevis coupling, see for example coupling assembly 206 in FIG. 7A) from a compatible coupling assembly of a subsequent rail car therebetween. In a further embodiment, the complementary blade may include a spherical bearing and rigid spacers for extending between the spherical bearing and each parallel blade thereof, and the coupling assembly may be adapted to accommodate a pin extending through the complementary and parallel blade apertures to form a joint.

Figure 6F:
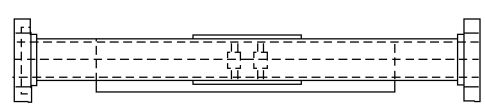
FIG. 6A is perspective view of an embodiment of a support frame for a front or lead rail car, and FIG. 6B-F provide cross sectional views of a support frame for a front or lead rail car.
Figure 6E:
Figure 6D:
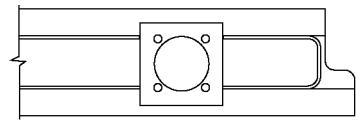
Figure 6C:
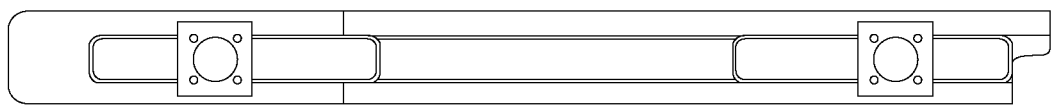
Figure 6B:
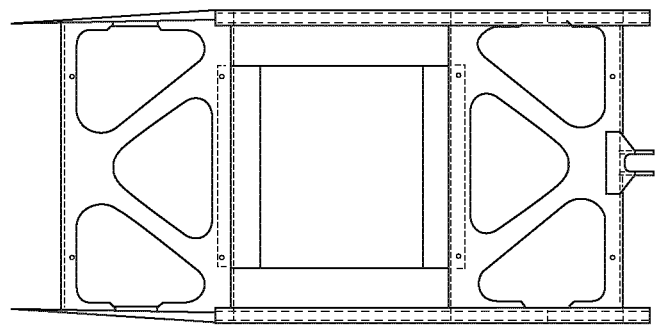

FIGS. 6B-F provide additional cross-sectional views of embodiments of support frames for a lead rail car similar to that shown in FIG. 6A.

Figure 7A:
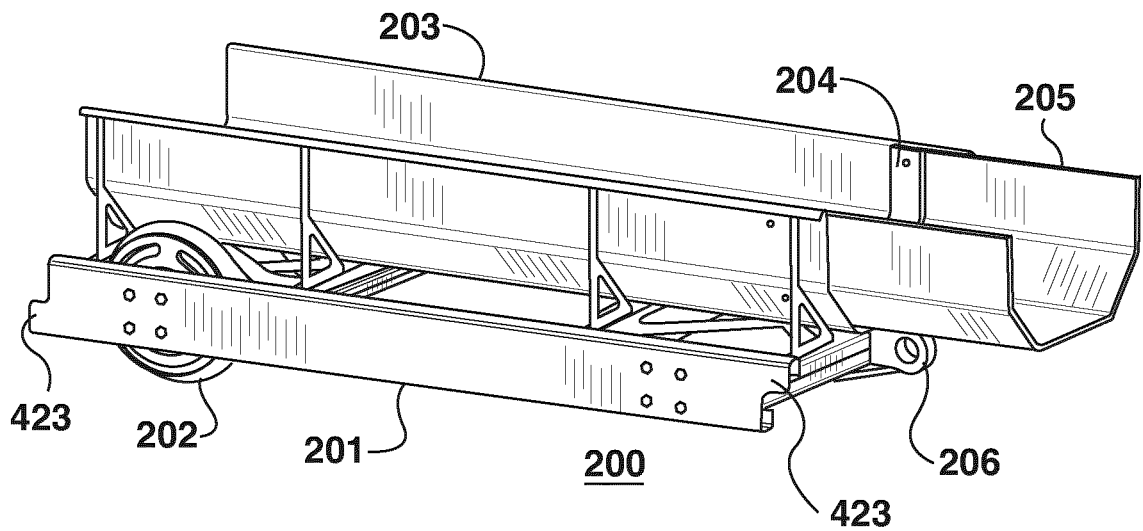
FIG. 7A and FIG. 7B provide perspective views of an embodiment of a middle or intermediate rail car, having a linking flap for overlapping with a subsequent rail car.
Figure 7B:
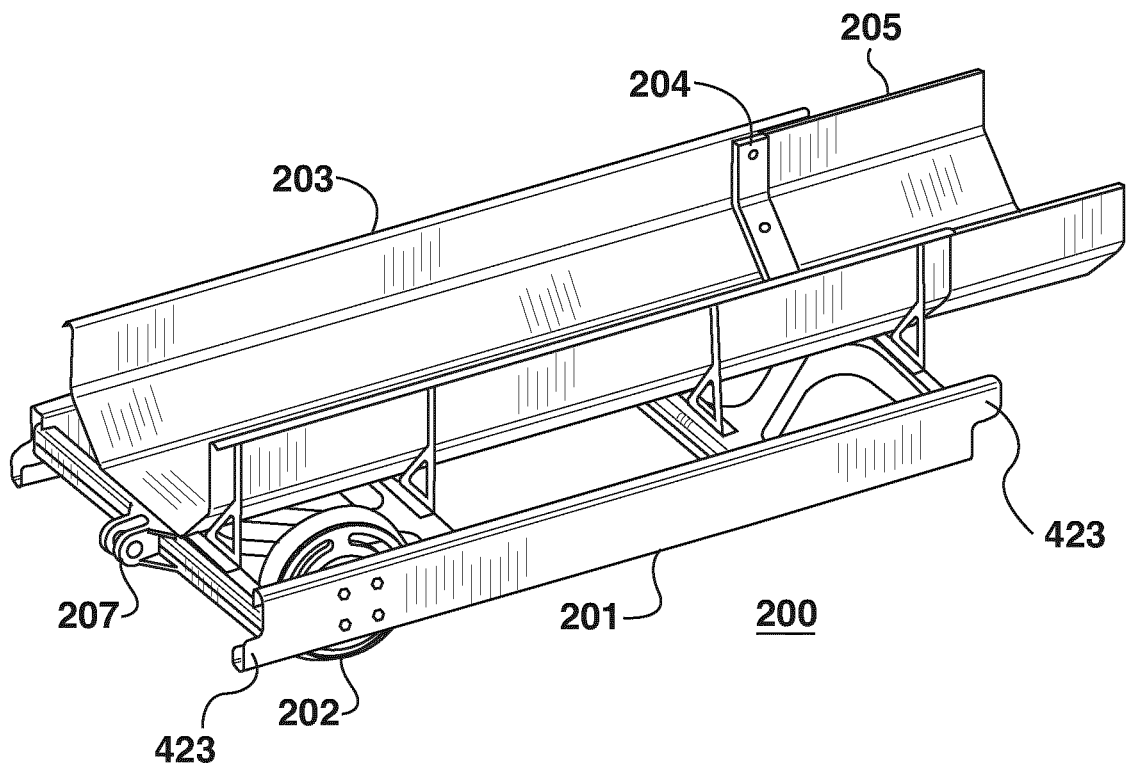

FIG. 7A provides a perspective view of one embodiment of a main/intermediate/middle rail car 200. The rail car 200 comprises a trough-type bulk materials container 203, a wheel and wheel hub assembly 202, and a support frame 201. The first cross member of the support frame, comprising a coupling assembly 206 (in this case, a male-type clevis fitting), is visible. FIG. 7B shows a second perspective view of the embodiment of a main/intermediate/middle rail car shown in FIG. 7A. The second cross member is visible, as well as a clevis-type coupling assembly 207 (in this case, a female-type clevis fitting) attached thereto. In this case, rail car 200 further comprises a trough strap 204 and a chute 205, such as a urethane chute, for overlapping with a trough of a subsequent, neighboring or adjacent rail car to prevent spillage between connected rail cars.

Figure 9A:
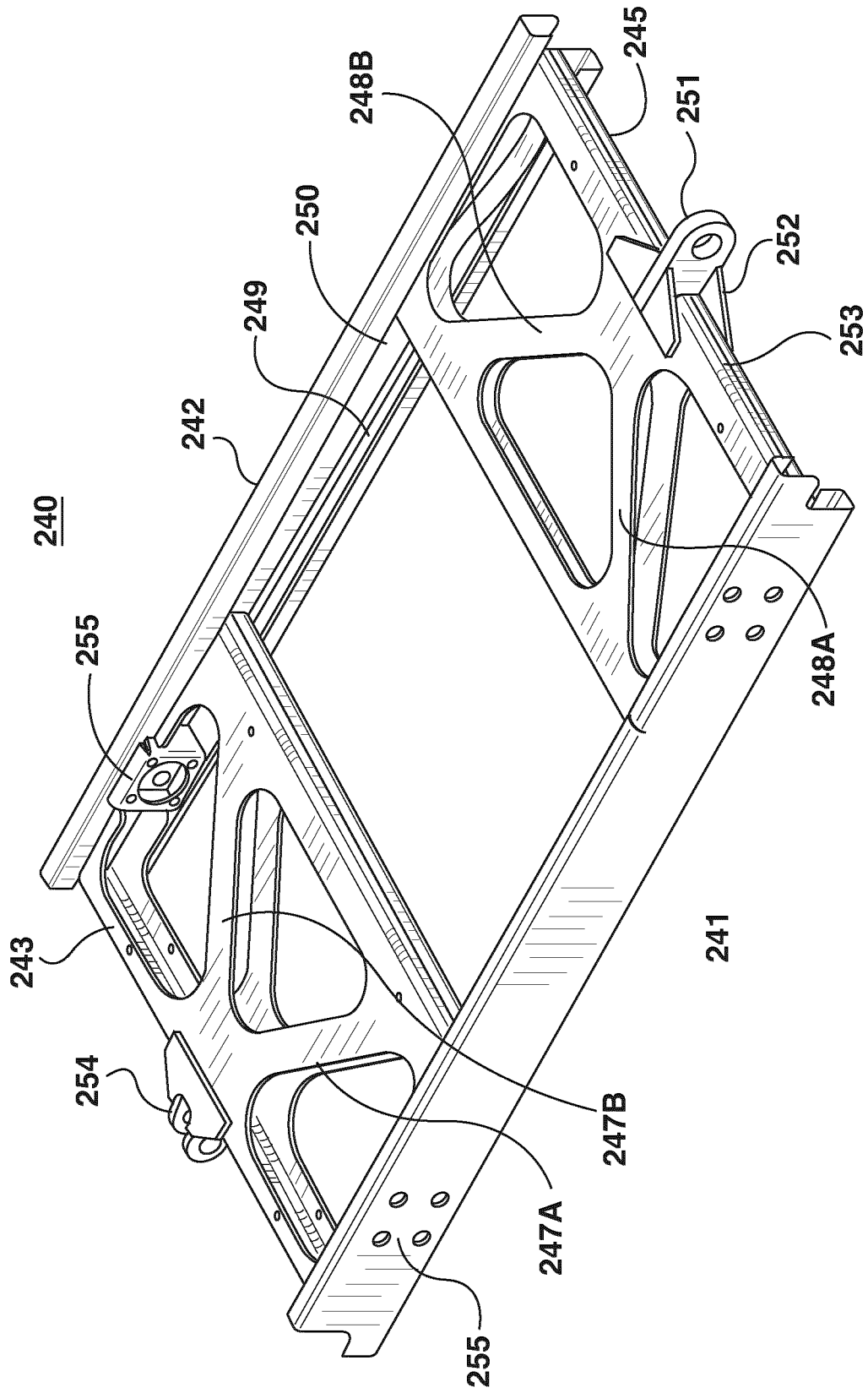
FIG. 9A is a perspective view of an embodiment of a support frame for a middle or intermediate rail car, and FIG. 9B-F provide cross sectional views of a support frame for a middle or intermediate rail car.
Figure 9F:
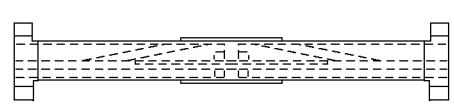
Figure 9E:
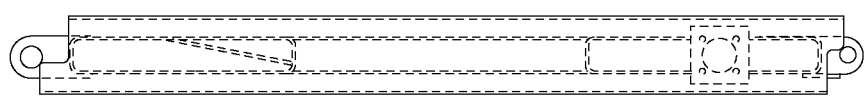
Figure 9D:
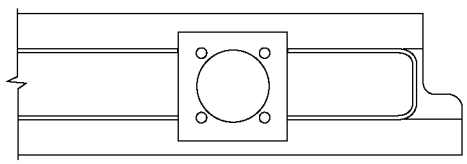
Figure 9C:
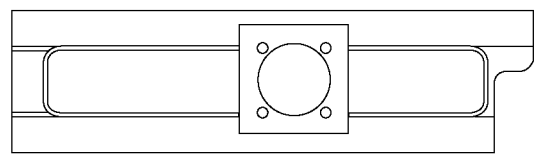
Figure 9B:
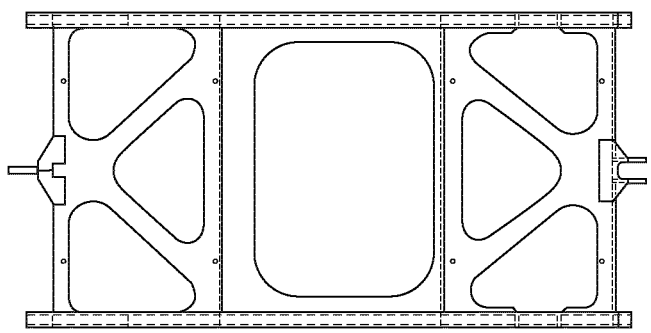

FIG. 9A provides a perspective view of one embodiment of a support frame 240 for a main/intermediate/middle rail car. The support frame 240 is for a rail car operable in a rail transport system including at least one drive station having a drive tire adapted to impart a driven moment to the rail car for conveying bulk materials on a rail. The support frame 240 comprises a first side drive plate 241 having a first end and a second end, a second side drive plate 242 having a first end and a second end, a first cross member 245 connecting the first and second side drive plates at or near their respective first ends, a second cross member 243 connecting the first and second side drive plates at or near their respective second ends, a third cross member 246 connecting the first and second side drive plates, the third cross member being spaced a first distance from the first cross member, and a fourth cross member 244 connecting the first and second side drive plates, the fourth cross member being spaced a second distance from the second cross member. The support frame 240 further includes a coupling assembly 251 (in this example, further including brackets 252) for attachment to a subsequent rail car, the coupling assembly positioned at the first cross member and adapted for connecting the subsequent rail car thereto, and a first diagonal support member 248A and a second diagonal support member 248B, each extending from the first cross member at a location near the coupling assembly to the third cross member, such that the first and second diagonal support members are connected to the first cross member at an angle sufficient to substantially direct forces from the coupling assembly to the third cross member and the first and second side drive plates. In the illustrated embodiment, the angle is about 45°, although angles between about 40° and about 50°, or beyond, may be possible. In the illustrated embodiment, the first and second diagonal support members are integral with the first cross member, as shown at 253. Each side drive plate of the support frame includes a surface adapted for frictionally contacting one or more drive tires and accommodating forces associated therewith such that drive tire driven moment is imparted to the side drive plate. As shown, the side drive plates, cross members and diagonal support members may form a support structure sufficient to carry a trough arrangement for carrying bulk materials.

In the embodiment illustrated in FIG. 9A, the support frame 240 further comprises a third diagonal support member 247A and a fourth diagonal support member 247B, each extending from the second support cross member to the fourth cross member, similarly to diagonal support members 248A and 248B. As well, the support frame 240 additionally comprises a lower center rib 249, and a center rib 250. In the illustrated embodiment, support frame 240 comprises two hub mounting brackets 255, to which wheels and wheel hub assemblies may be attached.

The support frame 240 of FIG. 9A is a support frame for a main/intermediate/middle rail car. This embodiment features two hub mounting brackets for attachment of wheels and wheel hub assemblies (although configurations having more wheels may also be possible), and two clevis-type coupling assemblies 251 (in this example, a male-type coupling) and 254 in this example, a female-type coupling) for coupling the rail car to subsequent rail cars (i.e. a subsequent front, rear, or middle rail car) on either end having a compatible coupling assembly (i.e. female or male, respectively). It will be appreciated that other configurations may be possible, for example the locations of the male and female fittings may be switched.

FIGS. 9B-F provide additional cross-sectional views of embodiments of support frames for a main/intermediate/middle rail car similar to that shown in FIG. 9A.

Figure 10A:
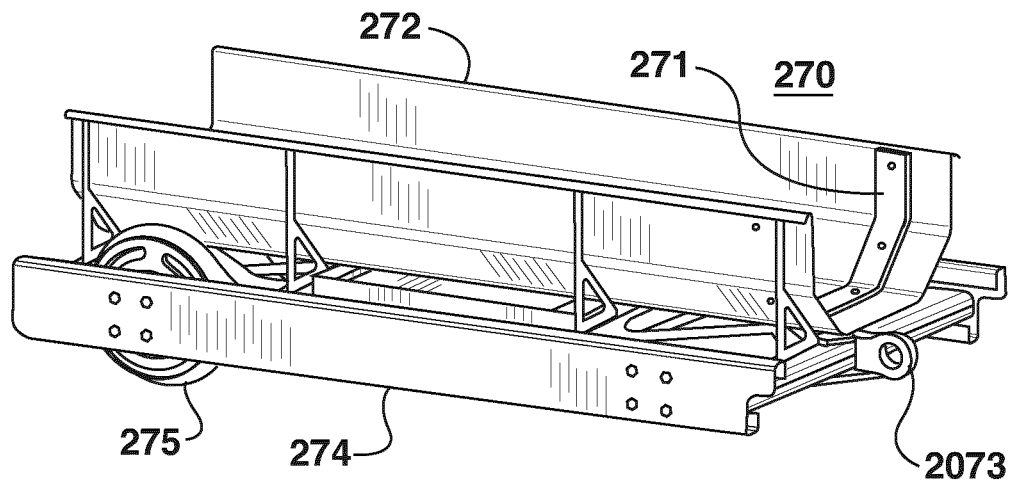
FIG. 10A and FIG. 10B provide perspective views of an embodiment of a rear or back rail car.
Figure 10B:
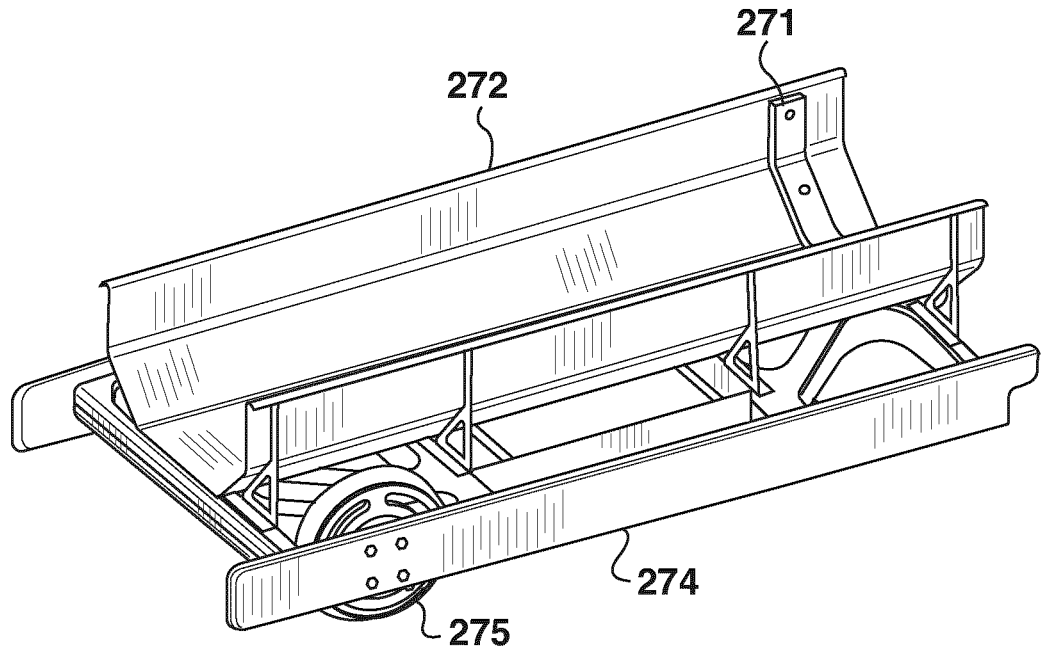

FIG. 10A provides a perspective view of one embodiment of a rear rail car 270. The rail car 270 comprises a trough-type bulk materials container 272 and a trough strap 271, a wheel and wheel hub assembly 275, and a support frame 274. The first cross member of the support frame comprising a coupling assembly 273 (in this case, a male-type clevis fitting) is visible. FIG. 10B shows a second perspective view of the embodiment of a rear rail car shown in FIG. 10A. Being a rear rail car, an additional (i.e. second) coupling assembly for attaching to a subsequent rail car is not needed.

Figure 11A:
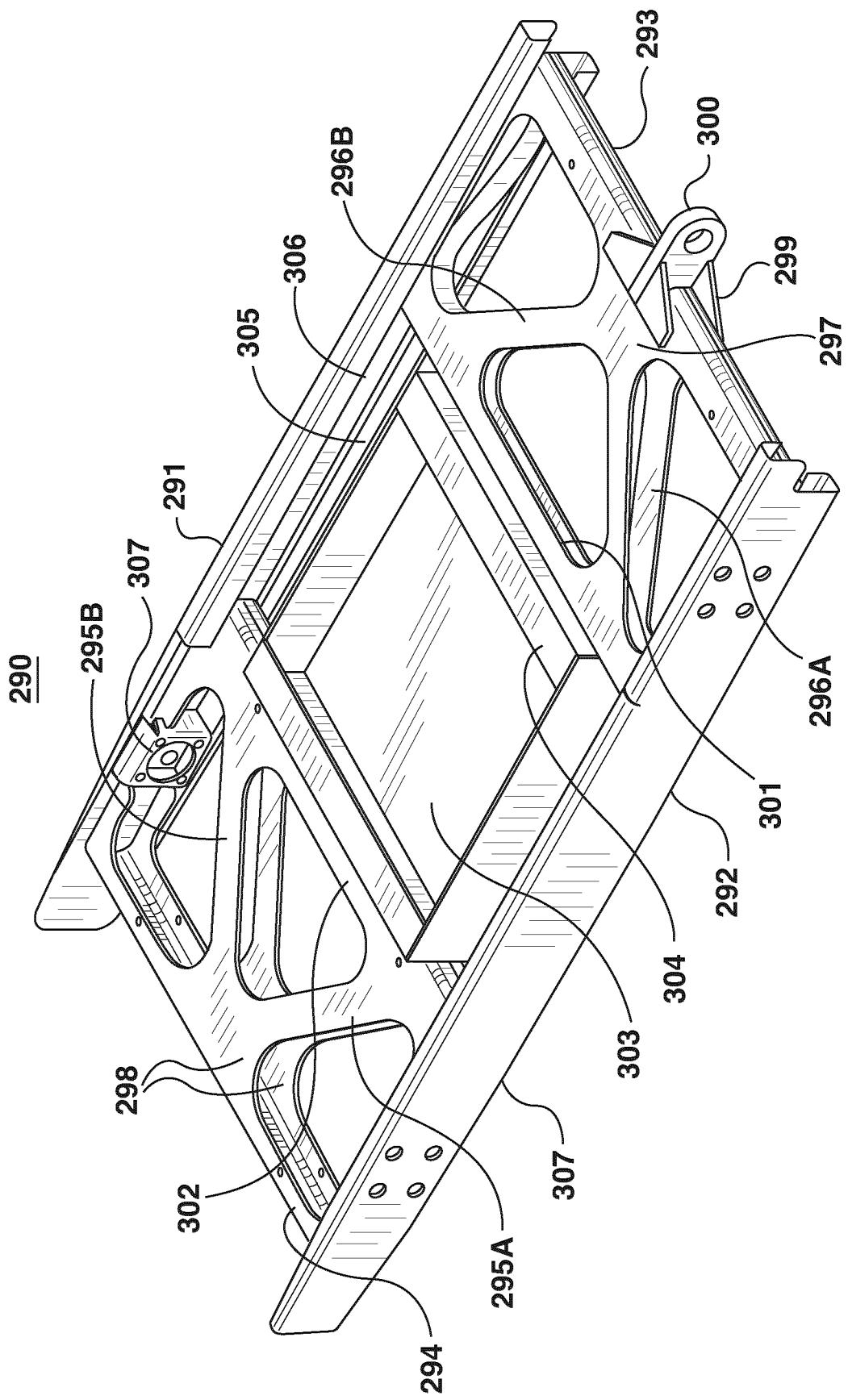
FIG. 11A is a perspective view of an embodiment of a support frame for a rear or back rail car, and FIG. 11B-F provide cross sectional views or a support frame for a rear or back rail car.
Figure 11F:
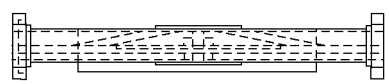
Figure 11E:
Figure 11D:
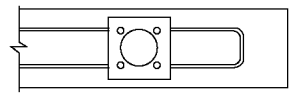
Figure 11C:
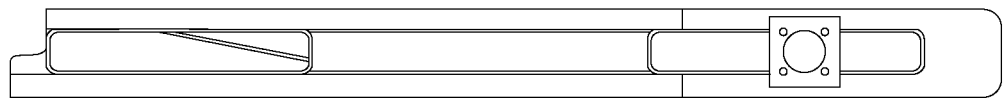
Figure 11B:
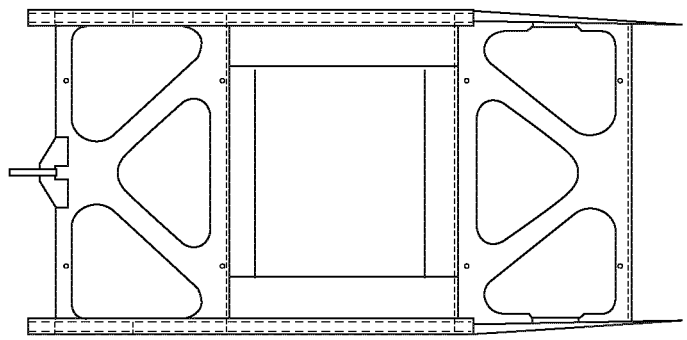

FIG. 11A provides a perspective view of one embodiment of a support frame 290 for a rear rail car. Support frame 290, which is for a rail car operable in a rail transport system including at least one drive station having a drive tire adapted to impart a driven moment to the rail car for conveying bulk materials on a rail. The support frame 290 comprises a first side drive plate 292 having a first end and a second end, a second side drive plate 291 having a first end and a second end, a first cross member 293 connecting the first and second side drive plates at or near their respective first ends, a second cross member 294 connecting the first and second side drive plates at or near their respective second ends, a third cross member 301 connecting the first and second side drive plates, the third cross member being spaced a first distance from the first cross member, and a fourth cross member 302 connecting the first and second side drive plates, the fourth cross member being spaced a second distance from the second cross member. The support frame 290 further comprises a coupling assembly 300 (in this example, further including brackets 299) for attachment to a subsequent rail car, the coupling assembly positioned at the first cross member and adapted for connecting the subsequent rail car thereto, and a first diagonal support member 296A and a second diagonal support member 296B, each extending from the first cross member at a location near the coupling assembly to the third cross member, such that the first and second diagonal support members are connected to the first cross member at an angle sufficient to substantially direct forces from the coupling assembly to the third cross member and the first and second side drive plates. In the illustrated embodiment, the angle is about 45°. The first and second diagonal support members are integral with the first cross member, as shown at 297. Each side drive plate of the support frame includes a surface adapted for frictionally contacting one or more drive tires and accommodating forces associated therewith such that drive tire driven moment is imparted to the side drive plate. As shown, the side drive plates, cross members and diagonal support members may form a support structure sufficient to carry a trough arrangement for carrying bulk materials.

In the embodiment illustrated in FIG. 11A, the support frame 290 further comprises a third diagonal support member 295A and a fourth diagonal support member 295B, each extending from the second support cross member to the fourth cross member, similarly to diagonal support members 296A and 296B. The third and fourth diagonal support members are integral with the second cross member, as shown at 298. As well, the support frame 290 additionally comprises a center rib 306, a lower center rib 305, a concrete box bracket 303, and a concrete box angle 304. As described above with reference to FIG. 6, in certain embodiments, front and/or rear rail cars may be outfitted with ballast weight. In the illustrated example, the center of the rail car may be plated in and filled with concrete to provide ballast weight. Elements for supporting a concrete slab may be provided as shown. Such an approach may facilitate maintaining a substantially constant cross section throughout the train, facilitating a better seal at the loading chute.

In the illustrated embodiment, support frame 290 comprises two hub mounting brackets 307, to which wheels and wheel hub assemblies may be attached.

The support frame 290 of FIG. 11A features two hub mounting brackets for attachment of wheels and wheel hub assemblies (although configurations having more wheels may also be possible), and a clevis-type coupling assembly 300 (in this example, a male-type coupling) for coupling the rail car to a subsequent rail car having a compatible coupling assembly (i.e. a female-type clevis coupling assembly). It will be appreciated that other configurations may be possible, for example the clevis-type coupling assembly may be a female type coupling fitting.

FIGS. 11B-F provide additional cross-sectional views of embodiments of support frames for a rear rail car similar to that shown in FIG. 11A.

FIGS. 8 and 12 illustrate embodiments of a railcar wheel design having a robust wheel hub assembly which may be easily maintained. The wheel hub assembly may have an integral design, as shown in FIGS. 8 and 12. The wheel hub assembly may also be configured to meet the minimum loading requirements of the train over a specific duty cycle and to meet the loads of the track profile (including flat sections, bends, and dump loop sections of the track).

Figure 8A:
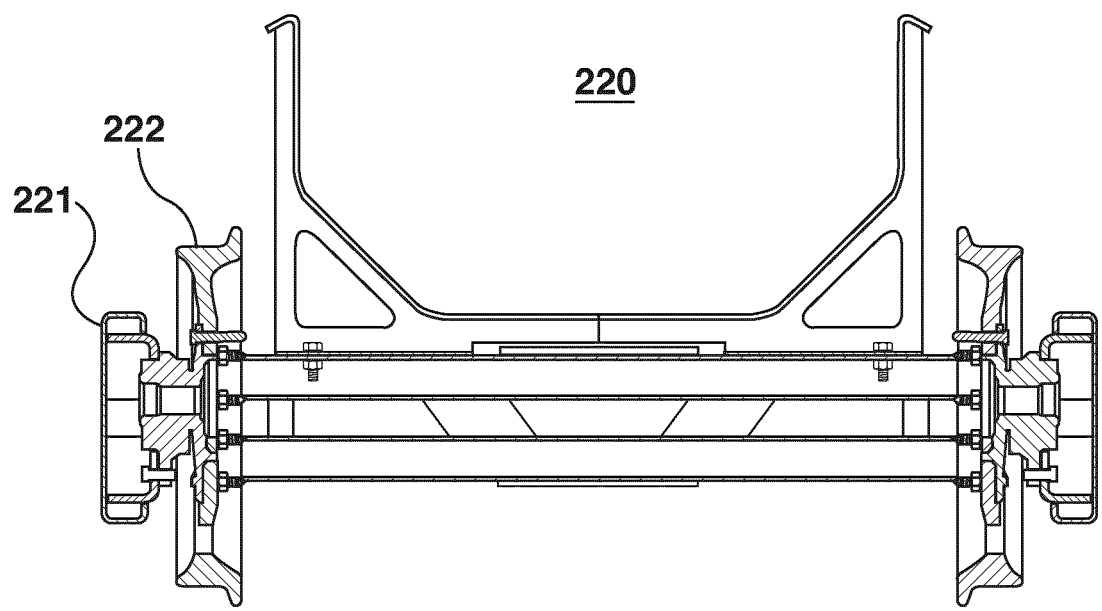
FIG. 8A and FIG. 8B provide a cross-sectional views of a rail car, showing an embodiment of a wheel and wheel hub assembly installed on a support frame for a rail car.
Figure 8B:
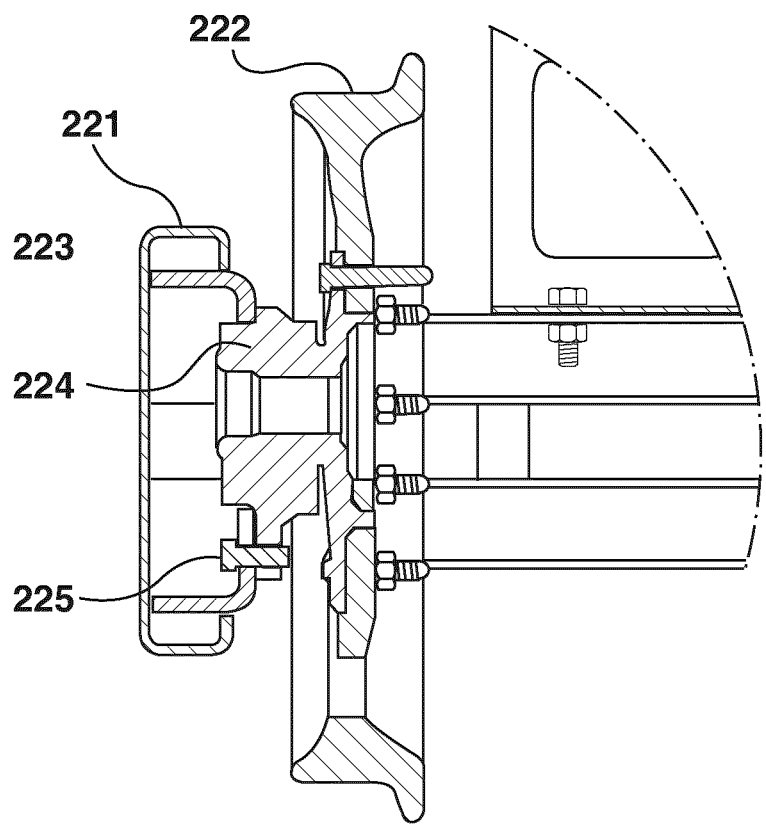

FIGS. 8A and 8B show cross-sectional views of an embodiment of a rail car comprising two wheel hub type assemblies each comprising a wheel 222. The wheel hub assemblies are installed at hub mounting brackets/wheel mounting structures, which are integrated with or otherwise connected to the side drive plates 221 at a surface of the side drive plates which does not frictionally contact the drive tire (in the illustrated embodiment, the wheel hub type assemblies with wheels are interior to the side drive plates and the support frame) and adapted to accommodate wheel hub type assemblies. The wheel hub assembly may comprise hub 223, and fasteners 224 and 225 for attachment. The wheel hub assembly may comprise a bearing and shaft arrangement with incorporated seals. The assembly may be mounted to the support frame using fasteners through the support bracket/wheel mounting structures. The wheel may be attached to the hub end, for example by using fasteners.

In one embodiment, the wheel hub type assembly may include a bearing having a self-contained assembly. In another embodiment, the wheel hub type assembly may include a bearing having a tapered roller bearing.

It will be appreciated that in certain embodiments each wheel hub type assembly may rotate an associated wheel independently from another wheel at another wheel hub assembly.

Figure 12D:
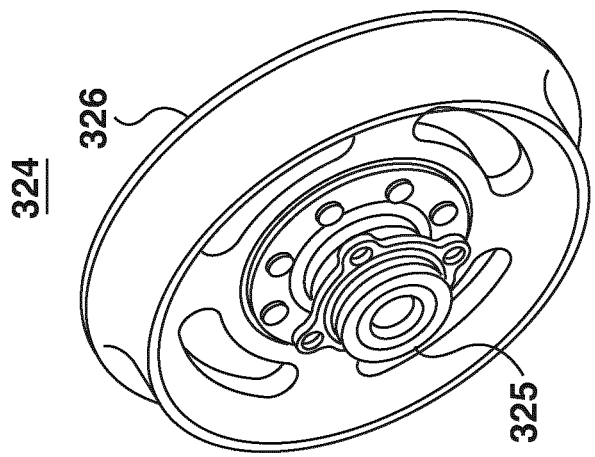
FIG. 12A and FIG. 12B provide cross-sectional side and top views, FIG. 12C and 12D provide side and perspective views, and FIG. 12E provides a cross-sectional view of embodiments of a wheel/wheel hub type assembly for installation on a support frame for a rail car.
Figure 12B:
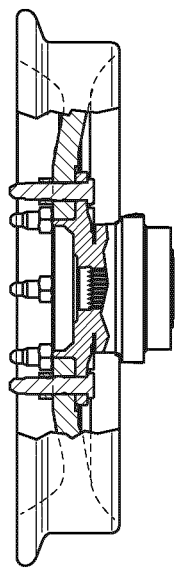
Figure 12C:
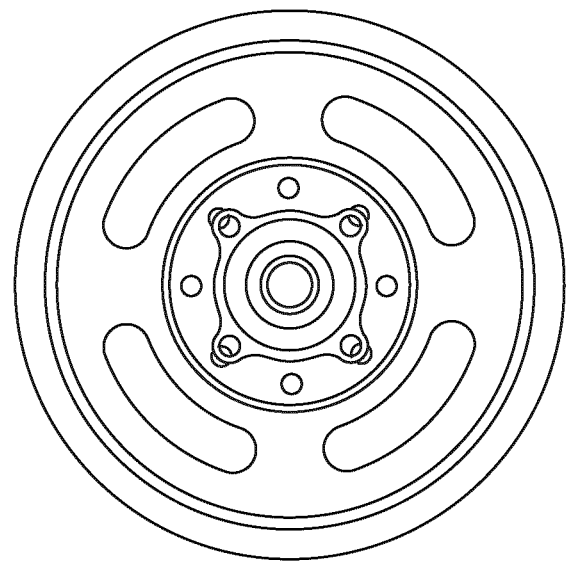
Figure 12A:
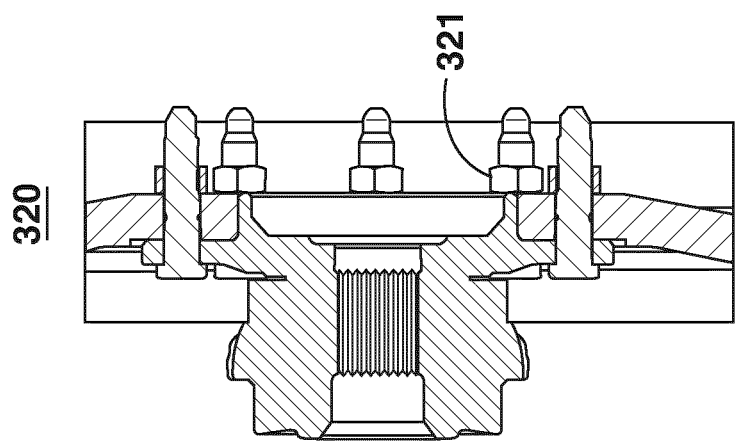
Figure 12A:
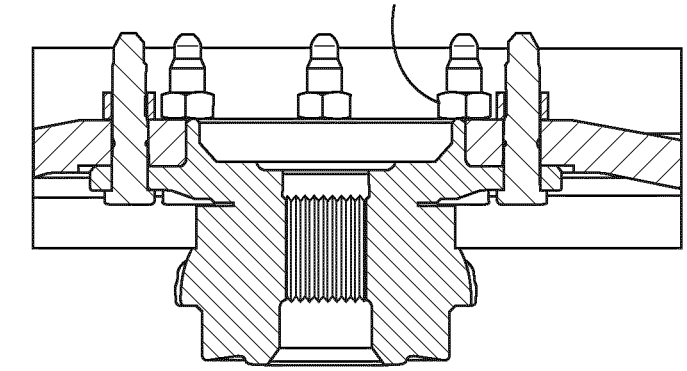
Figure 12E:
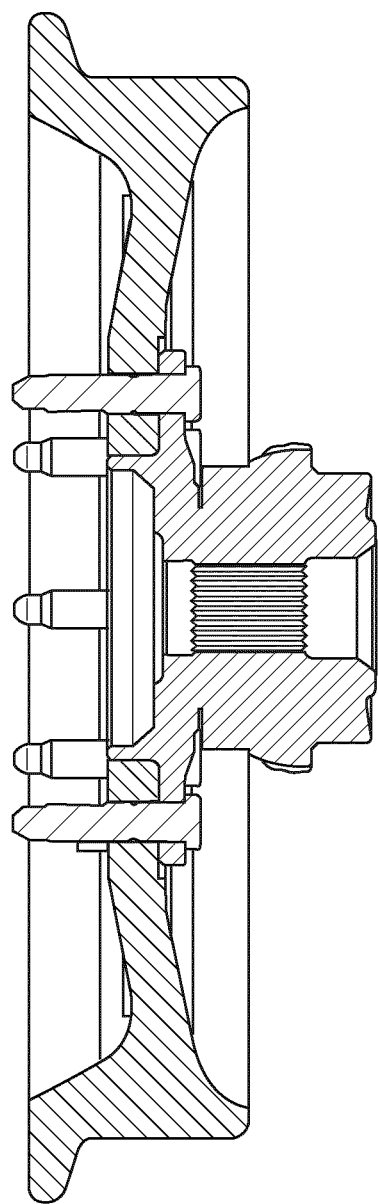

In one example, the wheel hub type assembly may include a bearing, and may be as shown in FIGS. 12A, 12B, 12C, 12D, and 12E. In FIG. 12A, a wheel hub type assembly 320 comprising hex nuts 321, a hub bearing unit, and a wheel are shown. FIGS. 12B and 12C show top cross-sectional and side views, respectively, of the wheel hub type assembly shown in 12A. FIG. 12D shows a perspective view of a wheel hub type assembly 324 comprising a wheel 326 and a hub unit bearing 325. FIG. 12E provides an additional cross-sectional profile view of an embodiments of a wheel hub type assembly comprising a wheel and a wheel hub. The illustrated wheel hub type assembly with associated wheel is adapted to be attached to a support structure as described herein at a wheel mounting structure of the support frame.

The hub unit bearing may be a tapered roller bearing, which may be comprised of a self-contained assembly, having two single inner rings, a counterbored double outer ring, a backing ring, two radial seals, an end cap and cap screws. Specifically, a packaged bearing may be used.

Referring back to the coupling of the cars of the train, after the lead car, the individual cars may have one set of wheels at the rear of the car and a single point connection to the car in front. In traditional arrangements, this connection was in the form of brackets with clevis pins and a compressive element. In an arrangement as set forth herein (see, for example, FIGS. 6G-I, FIGS. 5-7, and FIGS. 9-11), the connection may include compressible spacers, and wherein the inner race is locked with rigid spacers which provide space for rotation to occur. In embodiments, the connection may include a spherical plain bearing for a robust joint therebetween. In certain embodiments, rigid spacers between the inner race of the spherical bearing and the forks/parallel blades of the female clevis fitting may be used.

In certain embodiments, a compressible element may not be required in this arrangement. This may allow for a reduced looseness at the coupling.

Figure 13A:
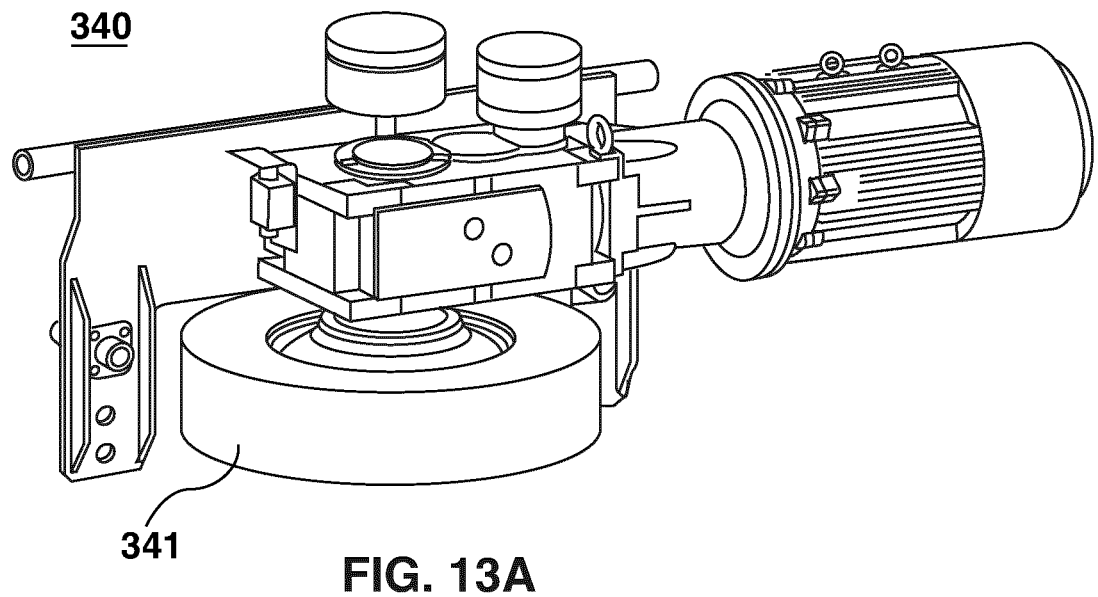
FIG. 13A and FIG. 13B provide perspective views of an embodiment of a portion of a drive station having a drive tire.
Figure 13B:
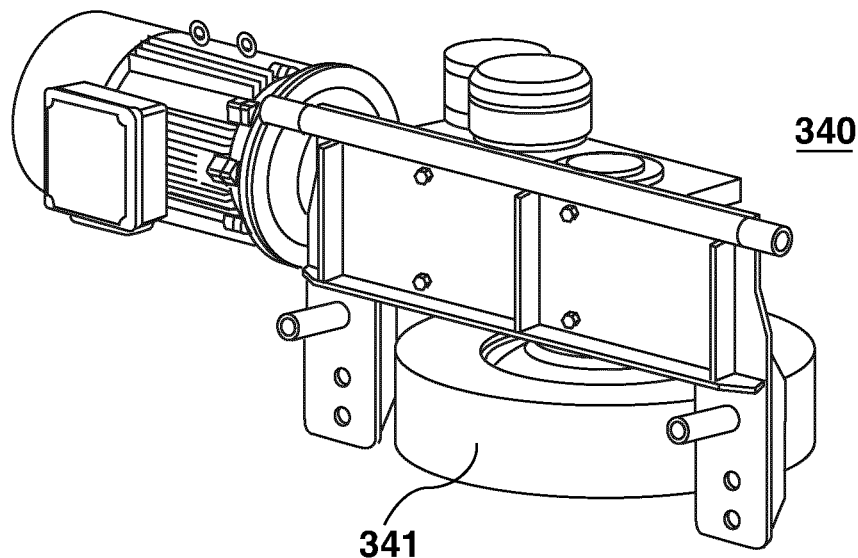
Figure 14:
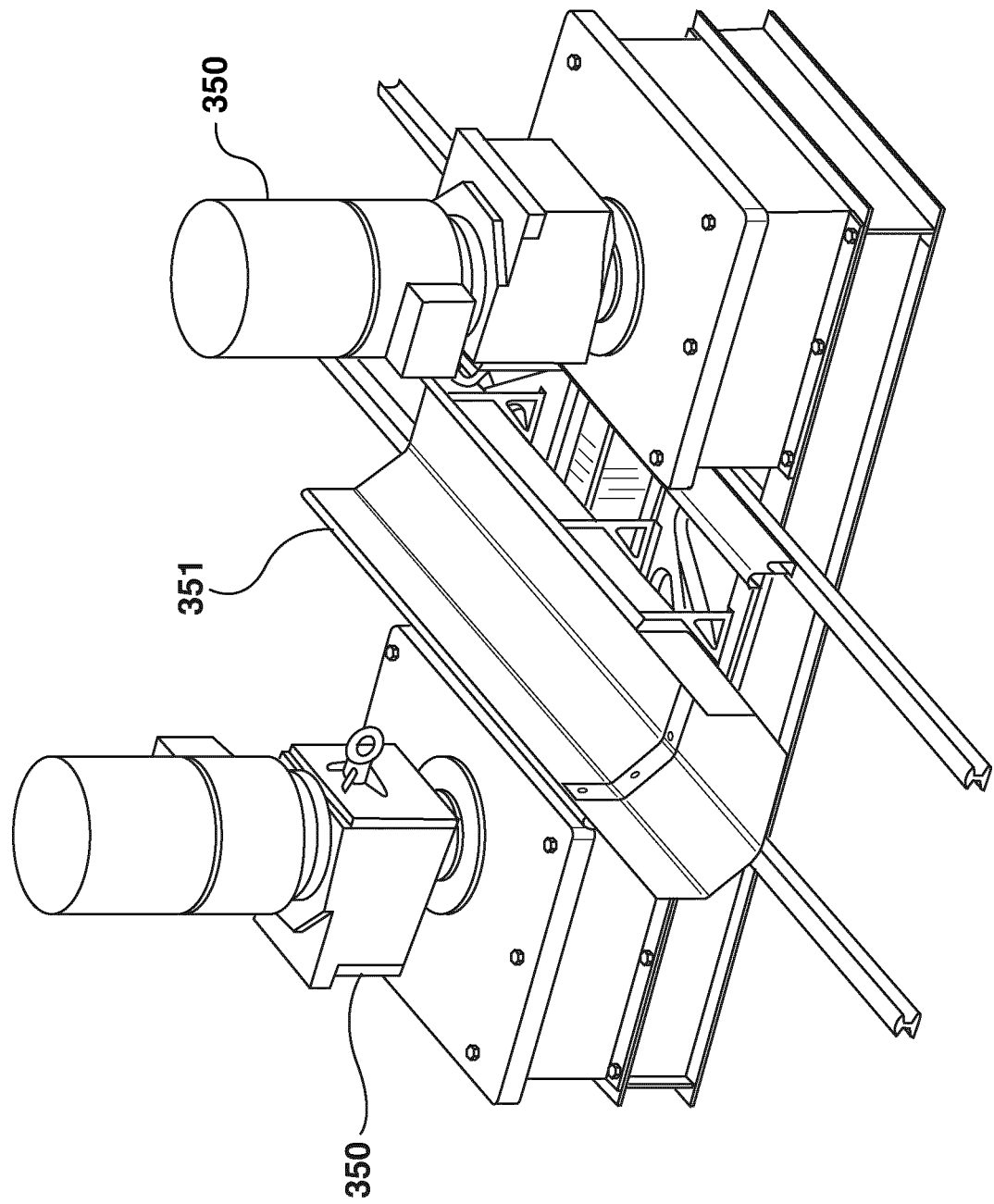
FIG. 14 is a perspective view of an embodiment of a section of a rail transport system, having drive stations with drive tires on either side of a rail track, with a rail car for transporting bulk material traversing said section.

Rail transport systems as described herein may include horizontal drive stations and/or vertical drive station arrangements. Examples of drive stations and associated components are shown in FIGS. 13A, 13B, and 14. Horizontal drive station designs may be utilized for installations having restricted height clearances. Horizontal drive stations may provide for a reduction of steel used in the system, improved manufacturability and, therefore, reduction in system component costs as compared to previous drive stations. The support structure of horizontal drive stations may also provide for improved maintainability and access to the drive tires. Specifically, the drive unit assembly including a drive tire, which are coupled to a variable frequency drive (VFD) (e.g., an electro-mechanical drive having the appropriate horsepower rating to propel the train and an appropriate gear ratio to move it at a designated speed, and to meet the desired duty cycle) may be pivotably connected to the support structure such that the unit may pivot for maintenance (e.g., removal of tires or servicing of the drive). Each drive unit operates a drive tire for frictionally contacting the side plate of a car. An arrangement may be provided to control the required opposing pressures to provide adequate forward or reverse thrust to move the train without slipping.

Furthermore, the plane at which the drive tire pivots may changed in the horizontal drive station as compared to prior drive stations. Changing this plane alters the way the reaction forces from the drive station thrust are carried to the weldment.

Specifically, earlier systems included a threaded rod which is used to pull the drive tire in by pivoting the entire drive into the train. In this arrangement, the normal (squeeze) force and the reactive thrust force are both carried as tension in the threaded rod.

Instead of the drive tire moving vertically with reference to the ground in prior drive stations, the improved drive tire may rotate on a plane parallel to the track. In this arrangement, force may be applied on a different plane than earlier systems, and the reaction force is separated out of the tensioning device. Specifically, the drive force and squeeze forces are separated, wherein the drive force is reacted at the pivot bearings and the squeeze force is isolated to the rotating element. In this way, the normal (squeeze) force can be reacted through a spring element which is designed to maintain the required force over a wider range of travel.

Specifically, an air spring arrangement may be provided which may be used to control such pressure (i.e., squeeze force) required between the tire and sideplate of the train (e.g., to adjust the tire/car engagement to account for tire wear and fabrication tolerances).

Referring now to vertical drive station designs, this arrangement may be utilized for installations having no height clearance restrictions. Vertical drive stations may provide for a reduction of steel used in the system, improved manufacturability and, therefore, reduction in system component costs. The support base of the vertical drive station may be of a steel structure rather than a cement foundation. The support structure may be more robust, while using less steel as compared to traditional systems. Specifically, the support structure may be formed using a laser cut/bent steel plate design instead of a structural member based design as used in tradition systems. The vertical drive station may also provide for improved maintainability and access to the drive tires. Specifically, the drive unit assembly including a drive tires are coupled to a variable frequency drive (VFD) via a drive mounting plate. In yet another arrangement, the drive unit may be a hydrodynamic device as shown having a fluid coupling arrangement. Either one of the drive unit or the drive mounting plate includes eyelets for hoisting the unit for maintenance (e.g., replacement of tires or servicing of the drive). Each drive unit may operate a drive tire for frictionally contacting the side drive plate of a car. An improved arrangement may be provided to control the required opposing pressures to provide adequate forward or reverse thrust to move the train without slipping. Specifically, a plurality of apertures are preformed in the drive unit mounting plate for selective adjustment to control such pressure required between the tire and rail by mounting the drive tire in selective proximity to the side rails of the car (e.g., to adjust the tire/car engagement to account for tire wear).

The various components of the drive unit may be optimized to provide the proper friction required between the drive tire and side plate of the car. The frictional forces of these drive tires-side drive plate contact may be optimized to avoid slippage between the drive tires and side drive plates, hence providing forward thrust. In one example, the surface of the side rail of the car may be adapted to improve such engagement with the drive tire (e.g., side rail or side drive plate material may be modified, textured, or a coating may be applied to the side rail or side drive plate to improve engagement or friction with the drive tire). In another example, various specifications of the drive tire (e.g., tire pressure, composition, durometer, spring rate, etc.) may be adjustable. The flexible drive tires may be made out of a variety of materials. Examples of suitable material include, but are not limited to, soft solid tires, synthetic rubber tires, urethane pneumatic rubber tires and synthetic foam filled tires. The preferred tire is a foam filled pneumatic tire. Foam provides the flex function associated with air filled tires without the potential problem of rapid deflation. The flexing capability compensates for irregularities in side plate spacing and also allowed for full contact of straight side plates even in deformed sections that would lead to contact skips with nonflexible tires. The use of a deflatable tire could cause a loss of traction and offer potential for derailment. As provided in earlier systems, it was desired to have a low durometer for the surface of the drive tire. In this way, the face of the foam filled tire would sufficiently spread (or sufficiently deform) upon contact with the side plate of the train to provide sufficient squeeze force to move the train.

The horizontal drive station and vertical drive stations may include a braking device coupled to the variable frequency drive (VFD). The braking device may be in the form of a dynamic braking arrangement to prevent train runaway on downhill runs and with positive locking brakes that are actuated in power off situations that can hold a train in place until the system can be returned to an operational status. Generally, braking may be achieved by two systems. In the first embodiment, a service braking arrangement is provided through the motor control system, which dynamically brakes the drives using the motors. In this arrangement, the braking effort is controlled by limiting the current to the motor. In another embodiment, a mechanical braking system is provided in the form of a hydraulic release arrangement, which is installed as an extension of an intermediate shaft of the gearbox. This mechanical braking system may be utilized for holding and emergency situations.

It will be appreciated that many different types, variations, and configurations of drive stations may be possible. FIGS. 13A and 13B illustrate an embodiment of a drive station 340 having a motor-driven drive tire 341 which may be used to impart a driven moment to a rail car for conveying bulk materials on a rail as described herein. Although a drive tire is referred to, it will be recognized that in certain embodiments other suitable drive wheels, belts, or rollers may be possible depending on the specific application. The motor-driven drive tire may frictionally engage with a side drive plate of a rail car as described herein while the rail car is passing the drive station along the rail tracks, imparting a driven moment or applied force to the rail car which drives the rail car forward. In certain embodiments, one or more drive stations 340 may be placed on both sides of the rail tracks, such that both side drive plates of a rail car as described herein may engage separate drive tires at substantially the same time, and may engage separate drive tires at substantially the same distance along the length of the rail car. FIG. 14 illustrates an embodiment of a section of a rail transport system, having drive stations 350 with drive tires on either side of a rail track, with a rail car 351 for transporting bulk material traversing said section.

In a further embodiment, support frames for rail cars as described herein may comprise side drive plates, each including a surface adapted for frictionally contacting one or more drive tires and accommodating forces associated therewith such that drive tire driven moment is imparted to the side drive plates.

Figure 15A:
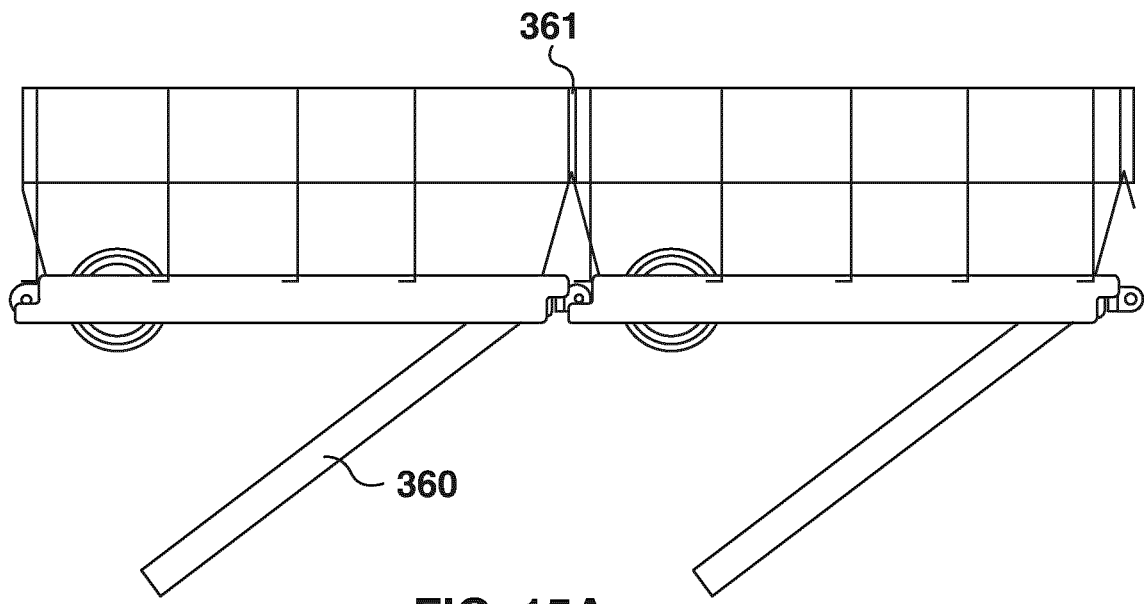
FIG. 15A and FIG. 15B provide side and perspective views, respectively, of an embodiment of bottom-dumping rail cars with having a continuous trough.
Figure 15B:
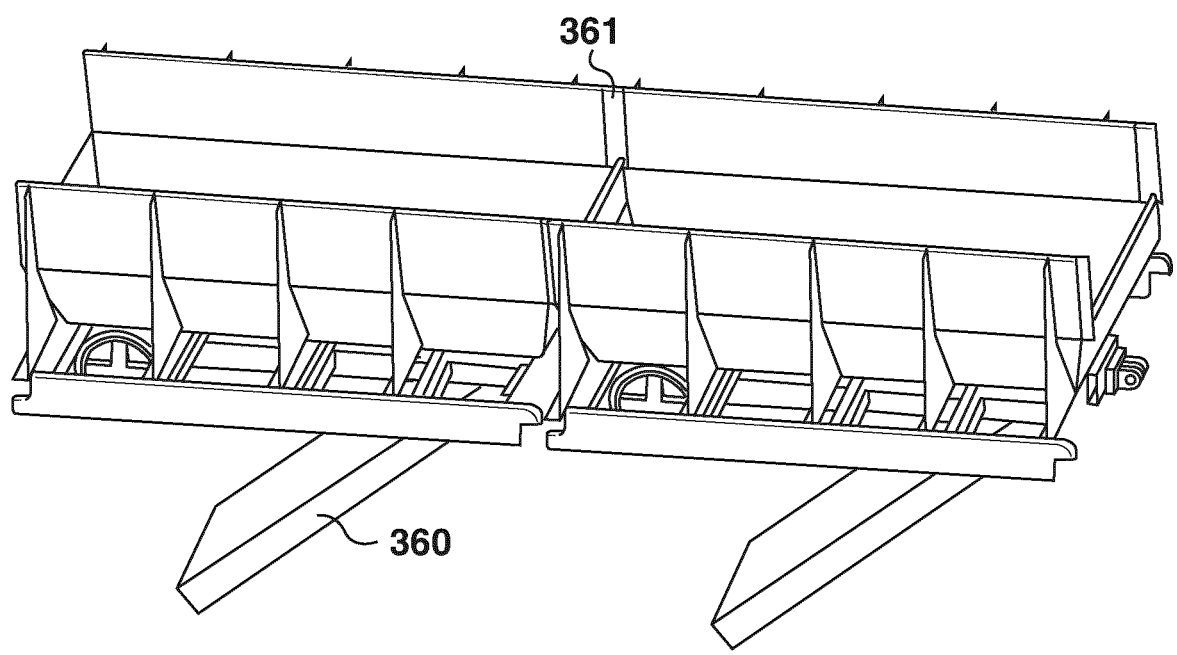
Figure 16A:
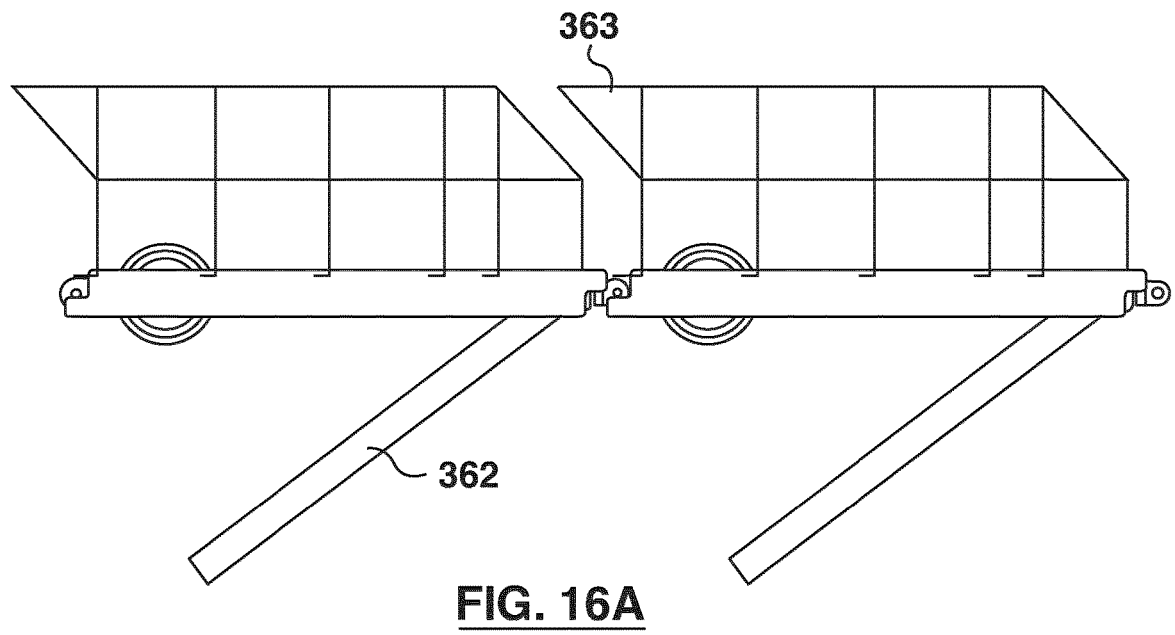
FIG. 16A and FIG. 16B provide side and perspective views, respectively, of an embodiment of bottom-dumping rail cars having individual troughs with overhangs.
Figure 16B:
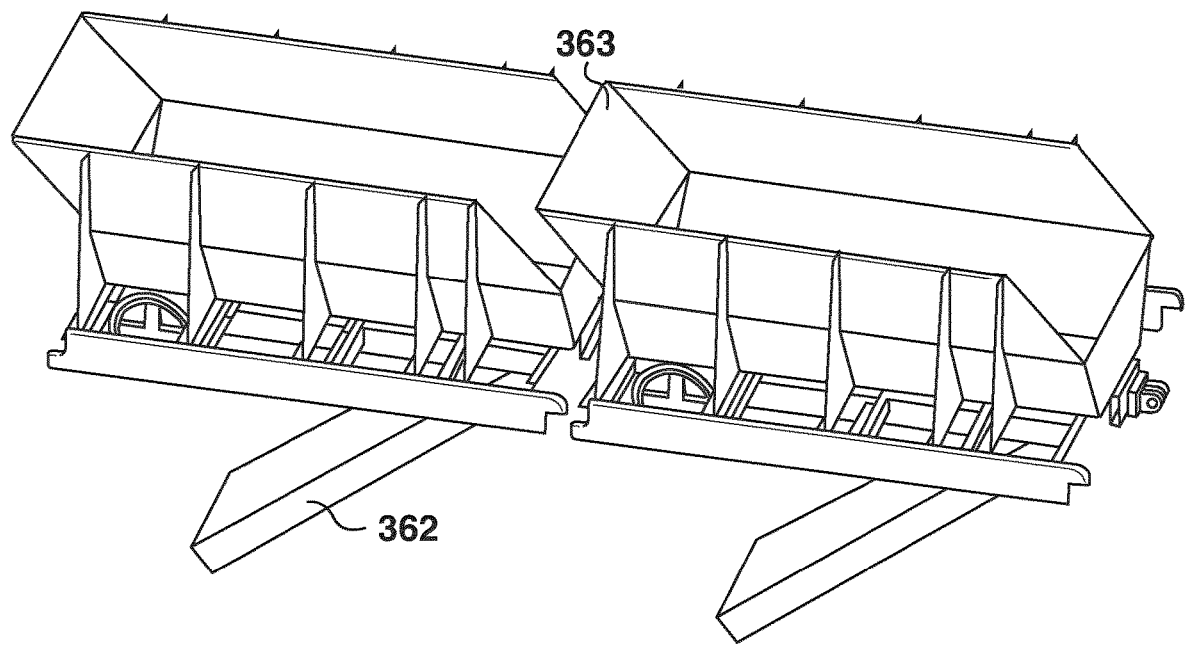

Examples of various dumping rail car designs, dump loops, and other improved arrangements for dumping the material carried by the rail cars are set forth in FIGS. 15-21. In one example embodiment, as shown in FIGS. 15 and 16, the bottom or floor 360/362 of each car may be pivotably attached to the rail car structure. The illustrated embodiments demonstrate dumping bottoms or floors 360/362 which are hinged to swing open and closed along a longitudinal orientation of the rail car, although the person of skill in the art will recognize that embodiments having dumping bottoms or floors which are hinged to swing open and closed in a lateral orientation along the rail car may also be possible. The bottom dumping bottoms or floors may be held in a closed position by one or more latches, pins, or other fastening elements of the rail car during transport. In certain embodiments, a triggering device or structure may be installed at a dumping location along a rail system to engage the one or more latches, pins, or other fasteners on the rail car structure to cause all or a portion of the bottom of each car to pivotably detach therefrom and one end and swing open, dumping the material from the car. Bottom dump rail cars in the open or dumping configuration are shown in FIGS. 15A, 15B, 16A, and 16B. At the end of the dump location, another triggering device or structure may engage the bottom of each rail car to pivotably reset/reattach it back to the car structure, resetting the one or more latches/pins/fasteners, returning the dumping bottom or floor to a closed position. The person of skill in the art will recognize that various mechanisms and configurations for latching, releasing, and resetting bottom dump rail cars may be possible for bottom dump rail cars as described herein. In one example, a spring loaded latch may be used.

Rail cars may optionally comprise a continuous trough design, in which rail cars are joined by a spacer element 361, and all or a portion of one rail car container space may be undivided from all or a portion of a subsequently attached rail car container space, as shown in FIG. 15. Alternatively, rail cars may optionally comprise an individual trough design, optionally having overhangs 363 between rail cars in some embodiments, as shown in FIG. 16.

Figure 17A:
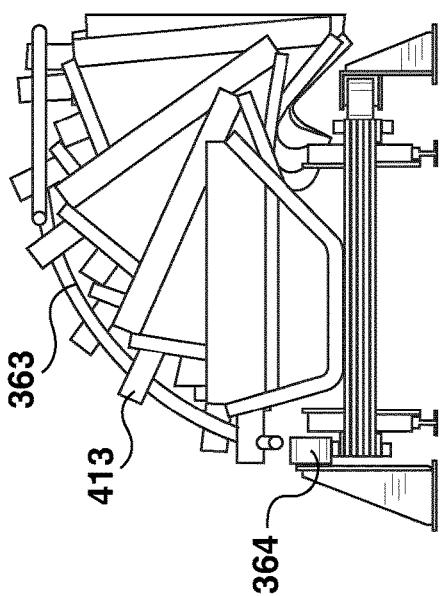
FIG. 17A and FIG. 17B provide end views, and FIG. 17C and FIG. 17D provide top and side views, of an embodiment of a rail transport system, with a traversing trail having rail cars, at a side dumping section of the rail transport system.
Figure 17B:
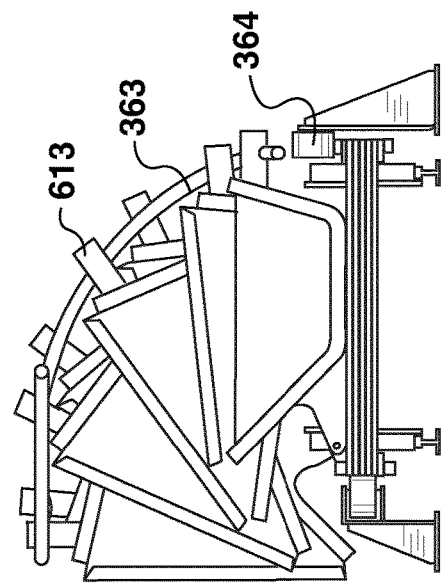
Figure 17C:
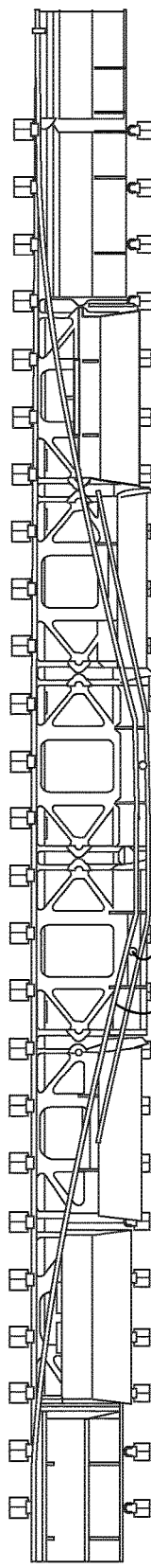
Figure 17D:
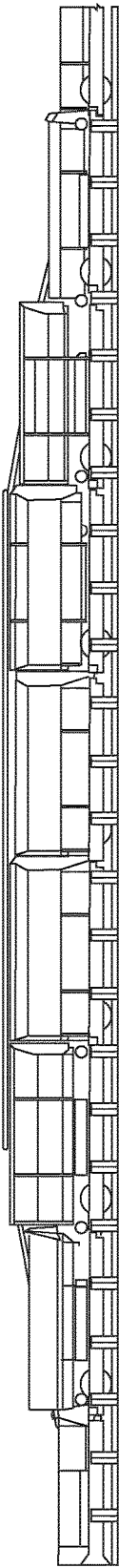
Figure 18B:
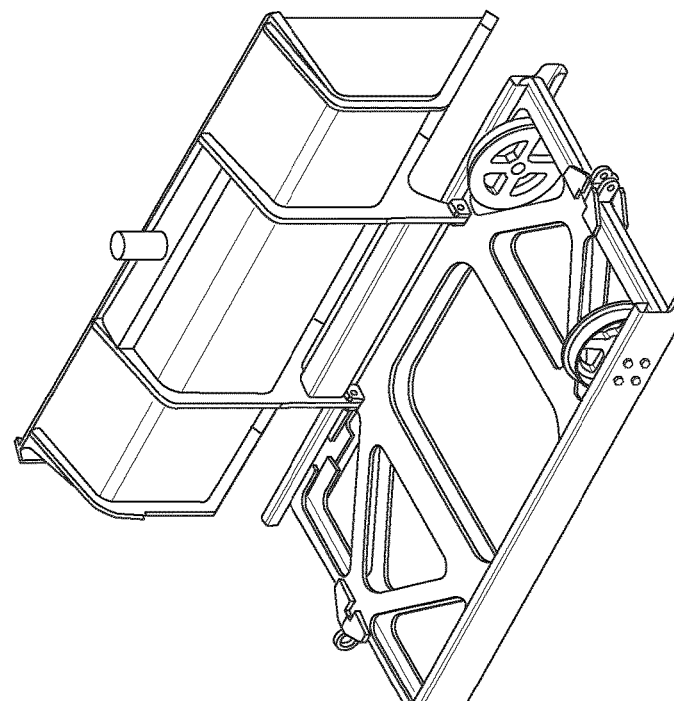
FIG. 18A, FIG. 18B, FIG. 18C, and FIG. 18D provide top, perspective, side, and end views, respectively, of an embodiment of a side-dumping rail car.
Figure 18D:
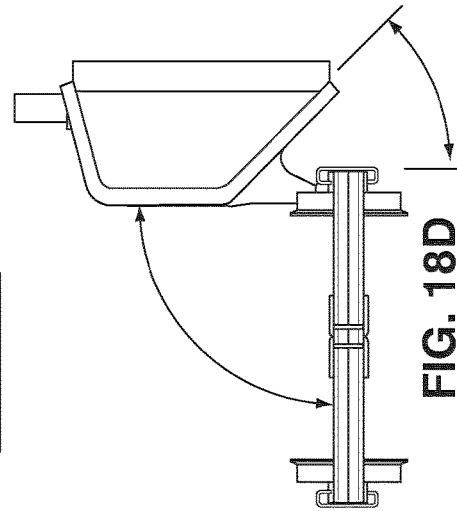
Figure 18A:
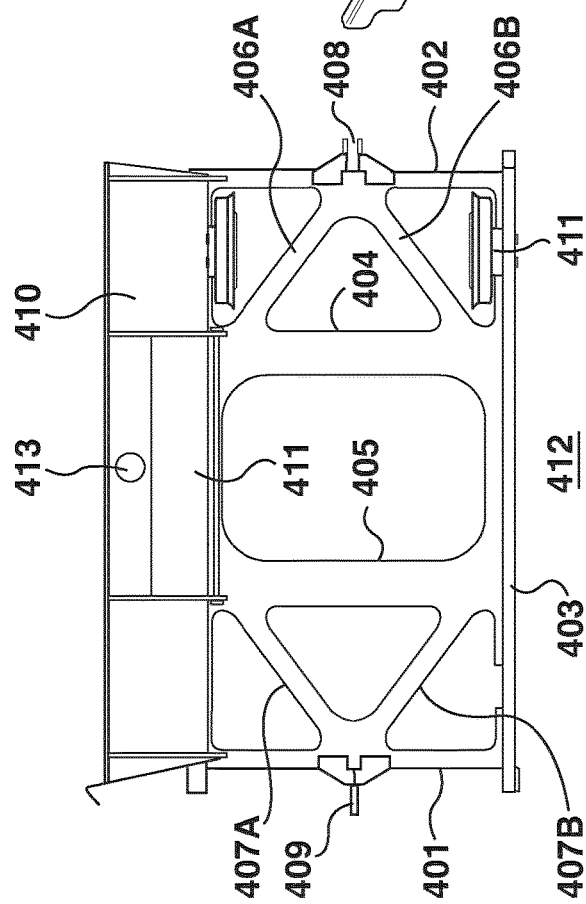
Figure 18C:
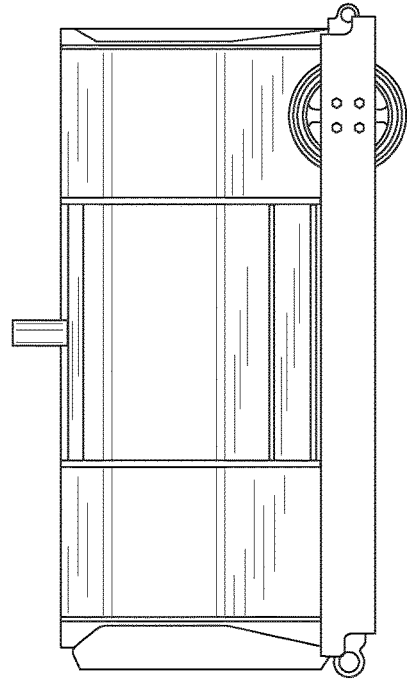
Figure 19:
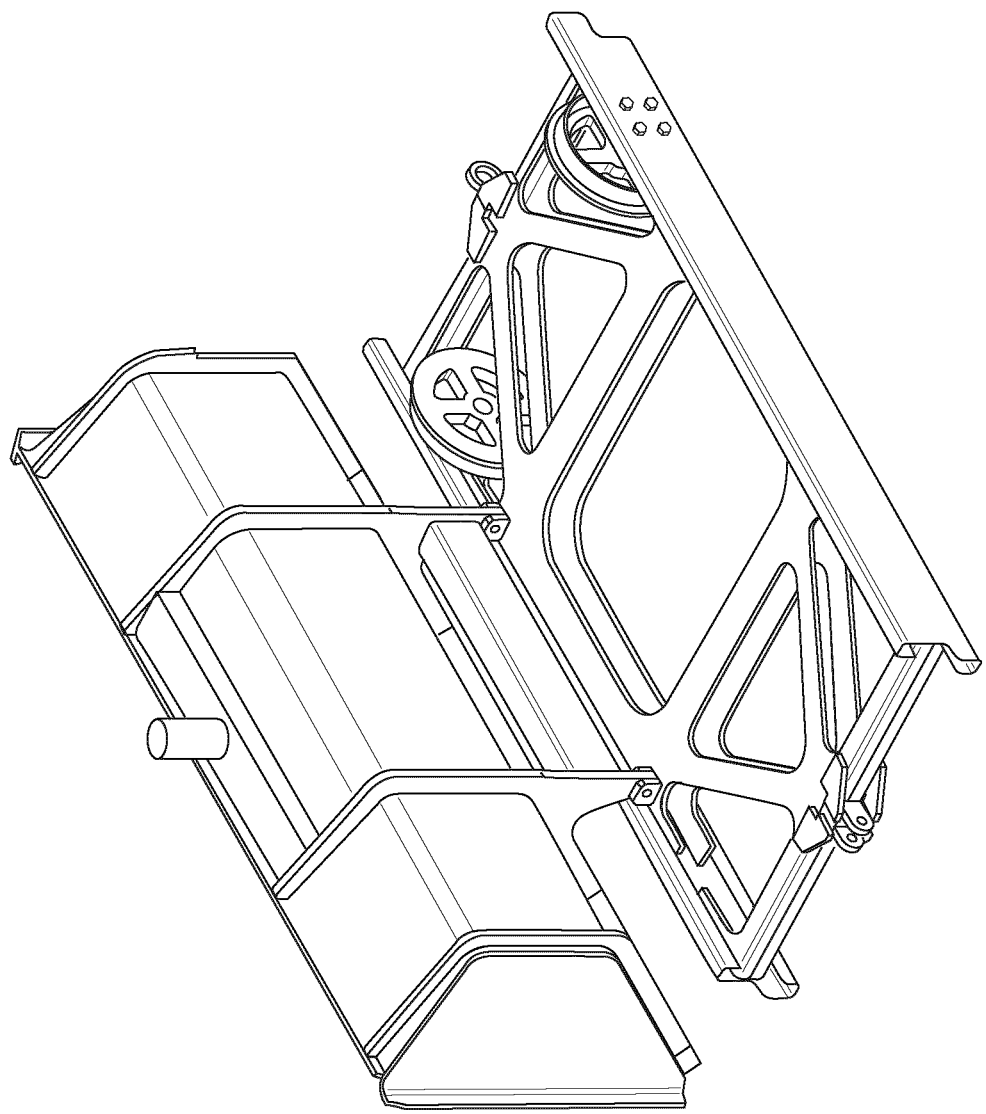
FIG. 19 is a perspective view of an embodiment of a side-dumping rail car.

Various examples of dump loop designs, including side dump loop arrangements (see FIGS. 17A-D), helical dump loop arrangements, modular dump loop arrangements, underground dump loop arrangements, among other arrangements may be possible. Embodiments of rail cars suitable for side-dumping configurations, such as that shown in FIGS. 17A-D, are shown in FIGS. 18 and 19. FIG. 18A provides a top view of one embodiment of a main/intermediate/middle side-dumping rail car 412. The support frame of the rail car comprises a first side drive plate 403 having a first end and a second end, a second side drive plate 411 having a first end and a second end, a first cross member 402 connecting the first and second side drive plates at or near their respective first ends, a second cross member 401 connecting the first and second side drive plates at or near their respective second ends, a third cross member 404 connecting the first and second side drive plates, the third cross member being spaced a first distance from the first cross member, and a fourth cross member 405 connecting the first and second side drive plates, the fourth cross member being spaced a second distance from the second cross member. The support frame further comprises a coupling assembly 408 for attachment to a subsequent rail car, said coupling assembly positioned at the first cross member and adapted for connecting the subsequent rail car thereto, and a first diagonal support member 406A and a second diagonal support member 406B, each extending from the first cross member at a location near the coupling assembly to the third cross member, such that the first and second diagonal support members are connected to the first cross member at an angle sufficient to substantially direct forces from the coupling assembly to the third cross member and the first and second side drive plates. In the illustrated embodiment, the angle is about 45°. The first and second diagonal support members are integral with the first cross member. Each side drive plate of the support frame includes a surface adapted for frictionally contacting one or more drive tires and accommodating forces associated therewith such that drive tire driven moment is imparted to the side drive plate. As shown, the side drive plates, cross members and diagonal support members may form a support structure sufficient to carry a trough arrangement for carrying bulk materials.

In the embodiment illustrated in FIG. 18A, the rail car 412 further comprises a third diagonal support member 407A and a fourth diagonal support member 407B, each extending from the second support cross member to the fourth cross member, similarly to diagonal support members 406A and 406B. In the illustrated embodiment, the support frame comprises two wheel hub mounting brackets (i.e. wheel support structures) 413, to which wheels and wheel hub assemblies may be attached.

The rail car 412 of FIG. 18A is a main/intermediate/middle rail car. This embodiment features two hub mounting brackets for attachment of wheels and wheel hub assemblies (although configurations having more wheels may also be possible), and two clevis-type coupling assemblies 408 (in this example, a female-type coupling) and 409 (in this example, a male-type coupling) for coupling the rail car to subsequent rail cars on either end having a compatible coupling assembly (i.e. male or female, respectively). It will be understood that other configurations may be possible, for example the locations of the male and female fittings may be switched.

The side-dumping rail car 412 shown in FIG. 18A comprises a bulk materials container 410, which is pivotably, hingedly or swingingly attached to the support frame of the rail car such that the bulk materials container 410 can be tipped or pivoted to one side, thereby dumping the contents of the container. The bulk materials container 410 may comprise a guide portion 413 for engaging a rail, ridge, or channel of the rail transport system at a dumping location. As shown in FIGS. 17A-C, as the rail car traverses the dumping location, the rail, ridge, or channel 363 may engage the guide portion 413, forcing the guide portion upward, dumping the contents of the rail car container. The rail transport system may additionally comprise a roller, rail, guide, ridge, or other barrier 364 above the track, to prevent the rail car support frame wheel(s) from tipping or lifting from the track while the rail car container is in the dumping position. An example of such an arrangement is shown in FIG. 17. FIGS. 18B, 18C, and 18D provide perspective, side, and cross-sectional views of the side-dumping rail car shown in FIG. 18A. FIG. 19 shows another perspective view of a side-dumping rail car embodiment.

Figure 20A:
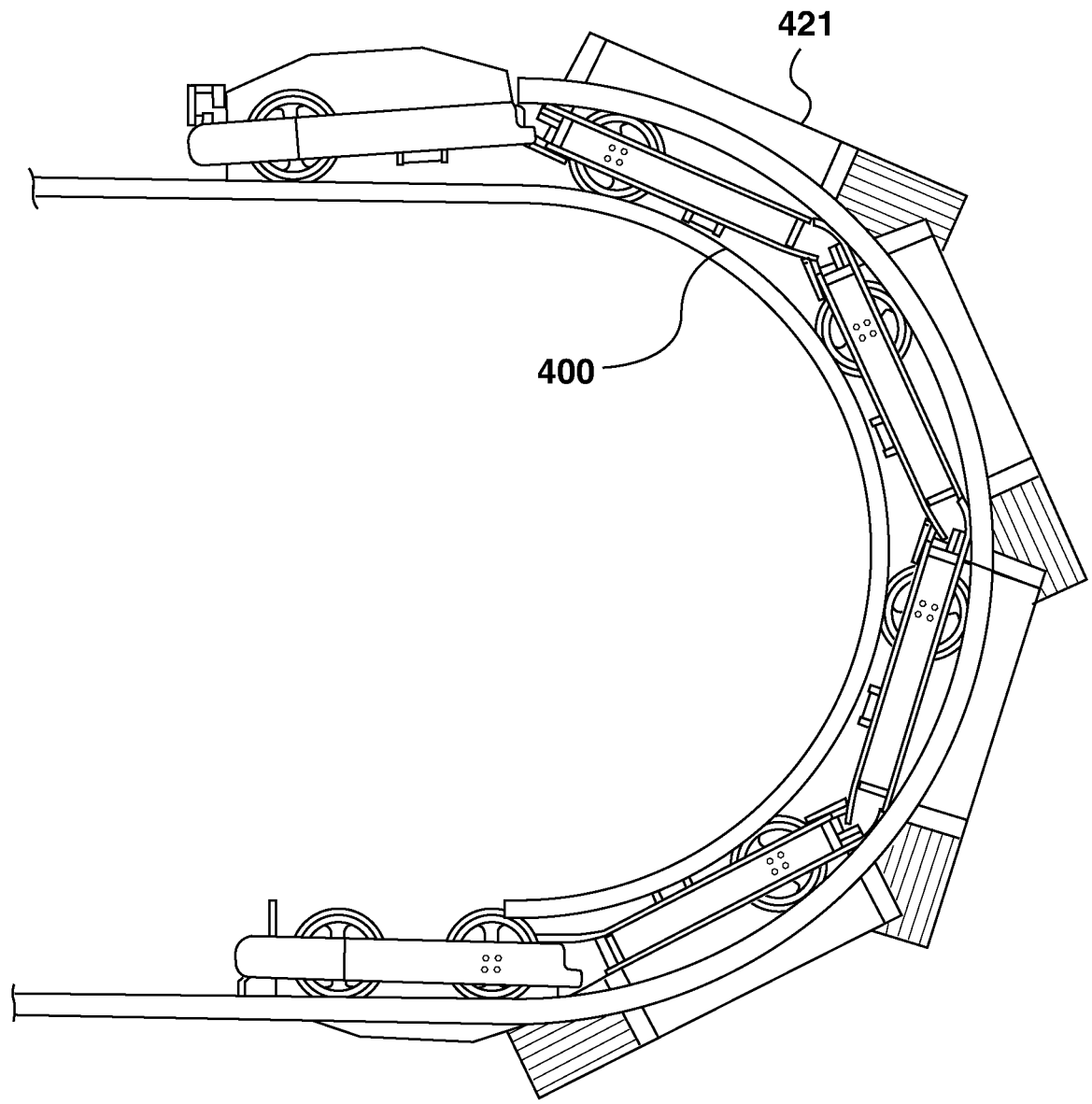
FIG. 20A provides a side view of an embodiment of a train, comprising multiple rail cars, traversing a dump-loop section of a rail transport system, FIG. 20B provides a perspective view of a dump-loop section of a rail transport system, and FIG. 20C provides a side view of another embodiment of a train, comprising multiple rail cars, traversing a dump-loop section of a rail transport system.
Figure 20B:
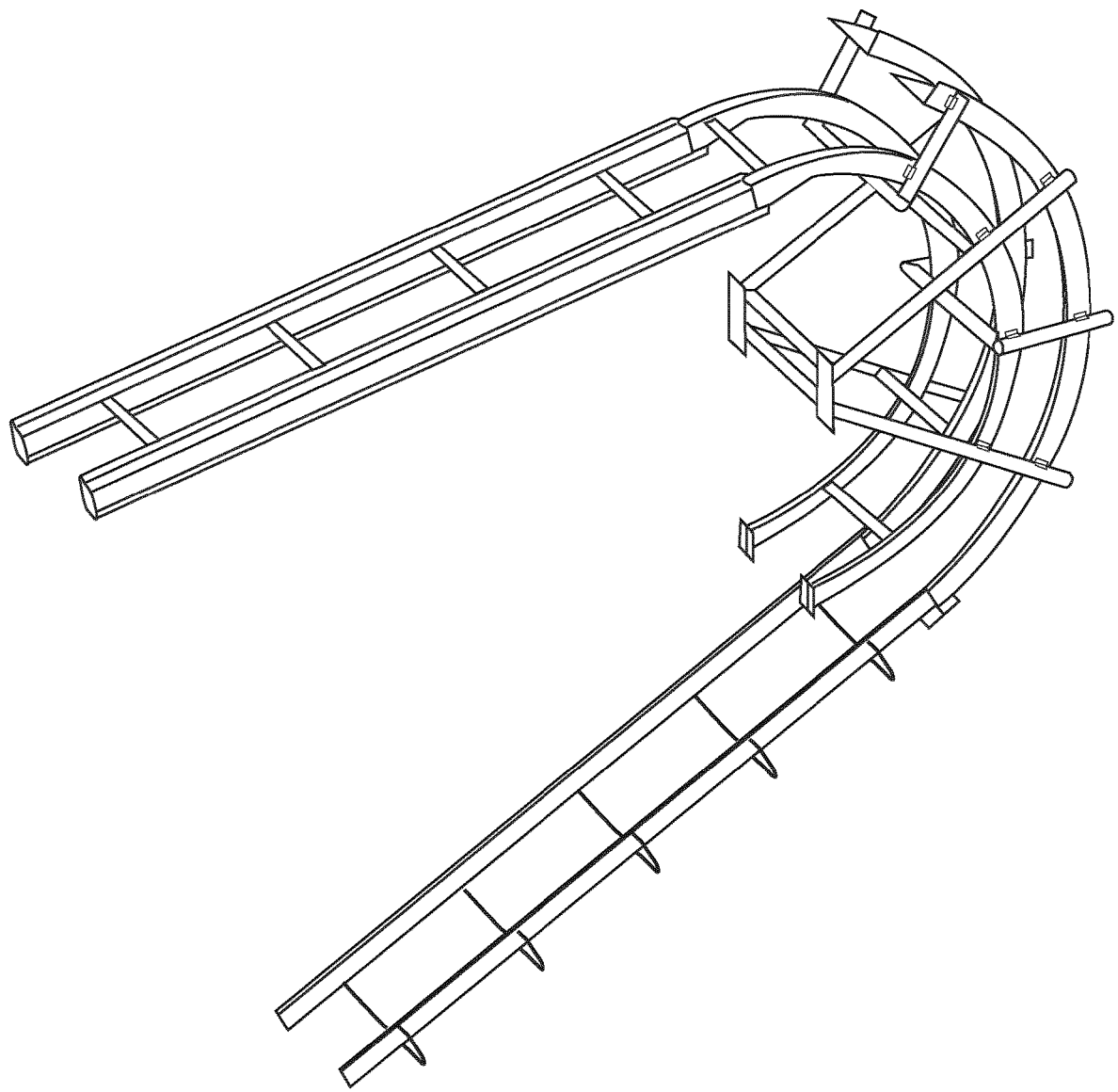
Figure 20C:
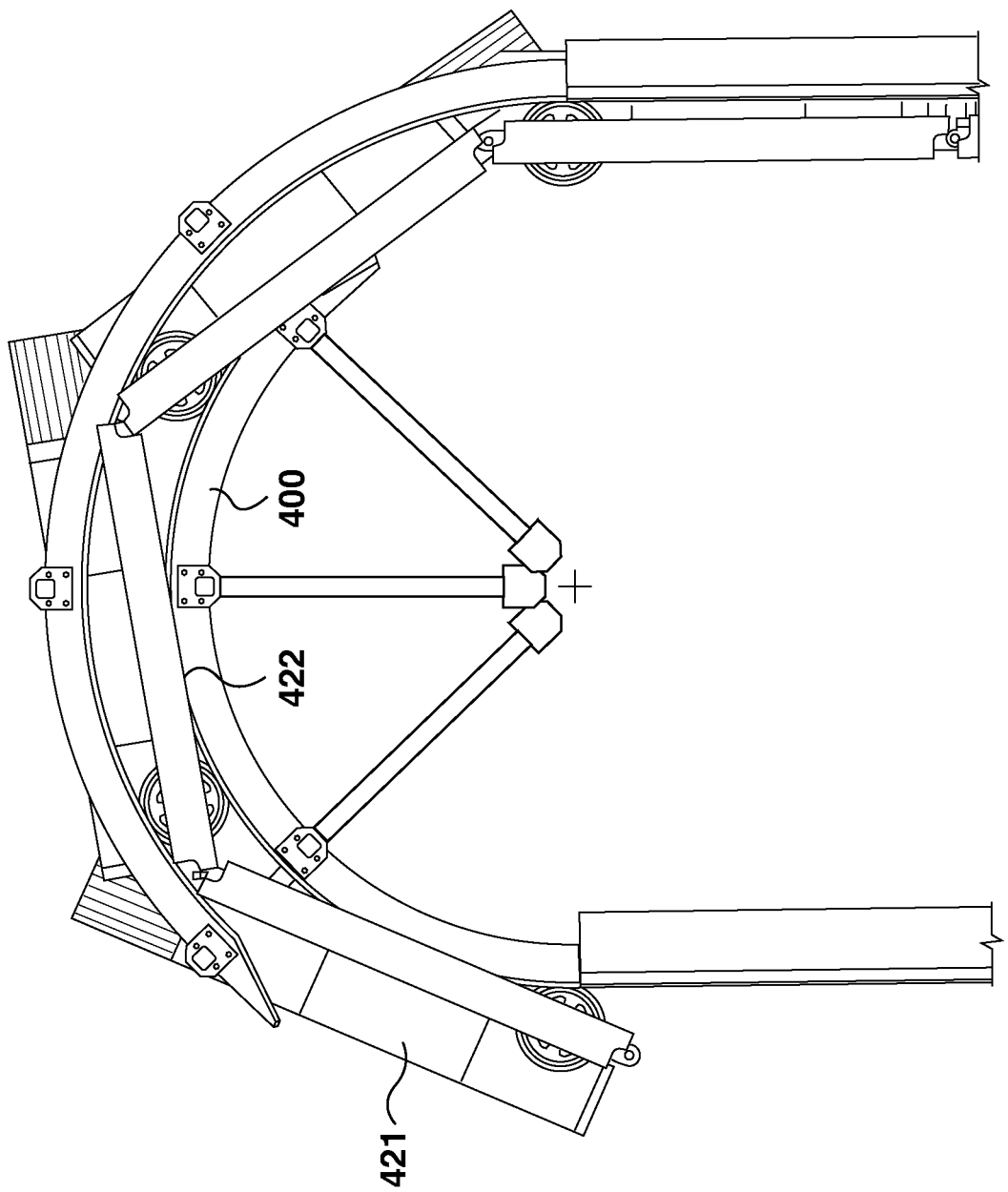

An illustration of a train, comprising multiple rail cars 421, traversing an example of a dump loop section 400 is shown in FIG. 20A. FIG. 20B provides an example of a suitable dump loop section 400. In certain embodiments, the support frame of the rail cars may comprise an area formed and bounded by the first side drive plate, the second side drive plate, the third cross member and the fourth cross member (see, for example, the central portion of the support frame shown in FIG. 9A), wherein the formed area may be adapted to accommodate passing of a curved rail therethrough and thereby allow for a tight vertical turn radius by the rail car. In an embodiment, the area formed and bounded by the first side drive plate, the second side drive plate, the third cross member and the fourth cross member of the rail car may be adapted to accommodate passing of a curved rail and thereby allow for a tight vertical turn radius by the rail car on a looped rail (see, for example, FIG. 20C). By way of example, FIG. 20C provides an example of a train, comprising multiple rail cars 421, traversing an example of a dump loop section, wherein the rails of the dump loop section partially extend above the lower edge of the side drive plates as the train traverses the dumping section (see, for example, label 422) and are accommodated therebetween in the area described above, allowing for a tight vertical turn radius.

Figure 21:
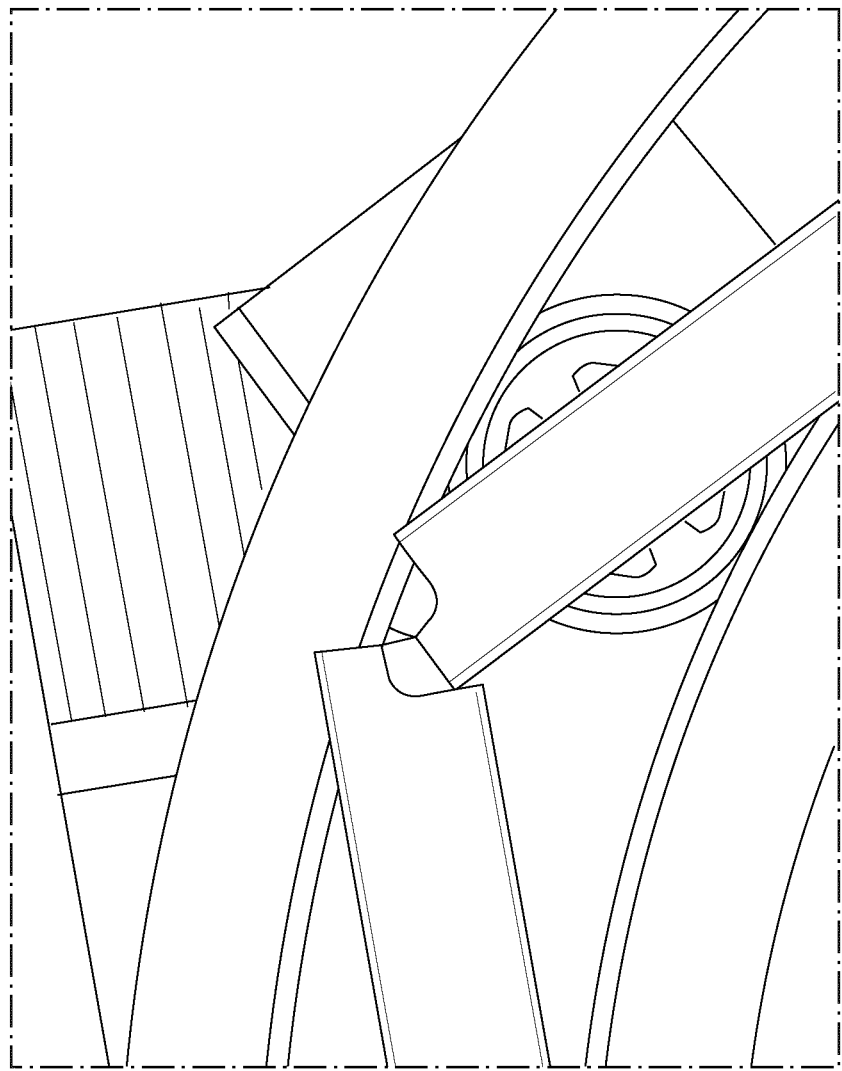
FIG. 21 provides a perspective view of an embodiment of side drive plates of two linked rail cars at the junction between the rail cars while the rail cars are traversing a vertical dump loop section.

In the illustrated embodiments in, for example, FIGS. 7A and 7B, the support frames may comprise lips, extensions, or overhangs 423 at the first and second ends of the first and second side drive plates, which may be compatible with the corresponding or counterpart lips, extensions, or overhangs of subsequently attached rail cars. On flat rails, the two corresponding or counterpart lips, extensions, or overhangs may provide a surface which reduces or nearly eliminates gaps between side drive plates on adjacent rail cars, providing a substantially continuous side drive plate surface along substantially the length of the train as shown in, for example, FIG. 15A, reducing wear and tear on the rail cars and drive stations during operation. The corresponding or counterpart lips, extensions, or overhangs may be adapted to provide a substantially continuous side drive plate surface along the train while on flat rails, while still allowing the train to easily traverse vertical dump loops or other similar rail sections, as shown in FIG. 21. In this manner, the side drive plates of a train may provide a nearly continuous support structure and side drive plate surface without interfering with tight vertical curves which may be used for dumping.

As set forth herein and with reference to FIG. 4, an improved method of controlling the rail transport system may optionally be provided with the rail transport system, which may be focused on the train (rather than the drive stations) and may be designed to determine the location of the train along the track to at least within one car length.

Referring back to FIGS. 1-4, drive stations 30 may be spaced along the track 12 such that at least one drive station has contact with a train in order to maintain adequate control. A control center 48 may be remotely located from the drive stations 30 with each of the drive stations communicating with the control center for providing status information, such as train location, train speed, performance of the drive station itself, and the like. Communications from drive station to drive station and to the control center may employ hard wire, optical fiber, and/or radio wave transmissions as is desired for the conditions within which the system is to be operated. This system allows the use of multiple trains. For example, a plurality of trains may be operated within a system comprising multiple drive stations 30 in communication with each other for driving both trains and maintaining a desirable spacing between the trains. As will come to the mind of those skilled in the art, now having the benefit of the teachings of the present invention, alternate track and drive station configurations are anticipated including a reinversion location for reversing the direction of the train or trains traveling within the system.

With regard to operation of the drive control system, only the drive in contact with the train will preferably be running at any given point in time. The control system uses the trains' location information to make small adjustments in train speed to assure the proper spacing of all trains on the course. With regard to acceleration rate, incline grade and incline length will likely determine the peak horsepower required by the drive motors. Because the control system is capable of communicating drive speed information between drive stations for synchronization purposes, a train need not be fully accelerated before entering the next drive station. In addition, longer acceleration times allow the use of smaller horsepower (lower cost) drive motors.

With continued reference to FIG. 4, the improved method of controlling the rail transport system may be focused on the train 14 (rather than the drive stations 30), and may be designed to determine the location of the train 14 along the track 12 to at least within one car length. Specifically, each of the drive stations 30 may include at least three sensors spaced generally apart from one another so as to not interfere with each other. Each of the cars of the train 14 includes a corresponding functional area (to be sensed by each of the sensors), such that when the train 14 passes through the drive station, each of the sensors may sense the corresponding functional area of each car. The corresponding functional area of the car is further preferably designed such that only one of the three sensors at the drive station 30 detects such functional area at one time.

In one example, each of the drive stations 30 includes three sensors spaced generally horizontally apart from one another at a select length so as to not interfere with each other (e.g., Sensor A, Sensor B, and Sensor C generally spaced at least about 18 inches apart). Each of the cars of the train 14 includes a corresponding functional area (to be sensed by each of the sensors) having an effective area such that only one of the three sensors at the drive station 30 detects such functional area at one time. The sensors may be a proximity, ultra-sonic, magnetic proximity or other comparable sensor. In this example, the proximity or ultra-sonic type sensors would each be used to detect a select surface area on each car, whereas the magnetic proximity sensor would be used to detect a magnet (e.g., a neodymium magnet) mounted on each car.

Using the three sensors, the control system is adapted to determine the location of the train 14 along the track 12 to at least within one car length. Specifically, as each car of the train 14 passes through a drive station 30, each sensor sequentially detects the corresponding functional area of a car and transmits an associated signal to the control system. In this way, presence or location of any one car of the train may be ascertained through this sensor arrangement at each of the drive stations.

This sensor arrangement may also be used to determine direction of movement by the train. For example, when a train is moving through a drive station in forward direction, a corresponding functional area on each car triggers sensor A, then sensor B and then sensor C, to send associated signals in sequence to a control center. When it receives the associated signals in this sequence (e.g., sensed A, sensed B, sensed C), the control center assumes that one car has passed through the drive station upstream (or in forward motion). When a train is moving through a drive station in reverse direction, a corresponding functional area on each car triggers sensor C, then sensor B and then sensor A, to send associated signals in sequence to the control center. When it receives the associated signals in this reverse sequence (e.g., sensed C, sensed B, sensed A), the control center assumes that one car has passed through the drive station downstream (or in reverse). If the control center receives any other sequence than (sensed A, sensed B, sensed C) or (sensed C, sensed B, sensed A), stoppage of the train or a fault is assumed.

The sensor arrangement may also be used to determine speed and acceleration of the train. For example, using (a) the distance between the corresponding functional areas of two cars and (b) the length of time between the detection of sensors (e.g., (a) the distance between a magnet located on car 1 and a magnet located on car 2, and (b) the length of time between the detection of the magnet located on car 1 and the magnet of car 2 by sensor A), the speed of the train may be determined. Furthermore, sensor data over time or the sensing of multiple cars over time may be used to determine acceleration of the train.

As discussed above, the sensor arrangement may generally be used to detect a stoppage of the train or a fault. Derailments can be caused by a number of factors, from debris on the track to the failure of a wheel bearing on the train. In one specific example, the sensor arrangement may be used to detect derailment of the train. The detection of a folded train is generally performed by comparing the number of cars between drive stations. Specifically, the sensor arrangement may be used to sense the number of corresponding functional areas on each car and, therefore, count cars that pass through a drive station. For example, if (a) drive stations D1 and D2 are 1140 ft apart and (b) each car is 67 ft in length each, there should be 17 cars between each drive station. If the difference of car count between each drive station is less than 17 cars or greater than 18 cars, then the control center assumes a possible derailment or a sensor failure. In turn, a signal will be sent to the drive station to stop the train.

In yet another embodiment, a control system is provided which mitigates damage from derailment by ensuring that the speed of each drive tire at an approaching drive station (e.g., D2) is maintained at the same speed as the train. Specifically, an improved system and method is provided for controlling the movement of the train 14 along the track 12 based on the speed or acceleration detected at a preceding drive station. In one example, first drive station 30 (DS1) moves the train along the track 12 at a preselected speed or acceleration toward a second drive station (DS2). The cars of the train are sensed by the sensor arrangement described above, and the position of the train 14 relative to the first drive station (DS1) and the second drive station (DS2) are ascertained. When the train 14 is determined to be within a certain distance from the second drive station (DS2), a command signal is transmitted to the second drive station (DS2), which initiates the drive tire 32 at the second drive station (DS2). In order to reduce wear of the drive tire and cars, the second drive station (DS2) engages and maintains the train at about the same speed and/or acceleration as at the first drive station speed. In other words, the second drive station (DS2) is initiated and maintained at the speed and/or acceleration rate assigned to the train by the control center. When select sensors at the second drive station (DS2) provide a determination that the second drive station (DS2) has engaged the train, a stop command is transmitted to the first drive station for the drive tire 32 of the first drive station to stop. In this fashion, the train will pass control from one drive station to another. The transition from one drive station to another is synchronized.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific examples of the embodiments disclosed and that modifications and other embodiments are intended to be included within the scope of the appended claims. Although specific terms are employed herein, they are used in a generic and descriptive sense only and not for purposes of limitation.

Described herein are support frames for a rail car, and rail cars, for a rail transport system. It will be appreciated that embodiments, illustrations, and examples are provided for illustrative purposes intended for those skilled in the art, and are not meant to be limiting in any way.

What is claimed is:

1. A support frame for a rail car for conveying bulk materials on a rail, said support frame comprising:
   a first side drive plate having a first end and a second end;
   a second side drive plate having a first end and a second end;
   a first cross member connecting the first and second side drive plates at or near their respective first ends;
   a second cross member connecting the first and second side drive plates at or near their respective second ends;
   a third cross member connecting the first and second side drive plates, the third cross member being spaced a first distance from the first cross member;
   a fourth cross member connecting the first and second side drive plates, the fourth cross member being spaced a second distance from the second cross member;
   a coupling assembly for attachment to a subsequent rail car, said coupling assembly positioned at the first cross member and adapted for connecting the subsequent rail car thereto;
   one or more wheel mounting structures each mounted to one of the side drive plates; and
   a wheel being supported mainly on one side to one of the one or more wheel mounting structures, and being unsupported on the other side of the wheel;
   wherein at least one side drive plate includes a surface adapted for frictionally contacting one or more drive tires and accommodating forces associated therewith such that drive tire driven moment is imparted to the side drive plate.

2. The support frame of claim 1, further comprising:
   a first diagonal support member and a second diagonal support member, each extending from the first cross member at a location near the coupling assembly to the third cross member, such that the first and second diagonal support members are connected to the first cross member at an angle sufficient to substantially direct forces from the coupling assembly to the third cross member and the first and second side drive plates.

3. The support frame of claim 1, wherein the support frame is for a rail car operable in a rail transport system including at least one drive station comprising the one or more drive tires, the one or more drive tires being adapted to impart a driven moment to the rail car.

4. The support frame of claim 1, further comprising a second coupling assembly positioned at the second cross member and adapted to connect another rail car thereto.

5. The support frame of claim 4, further comprising:
   a third diagonal support member and a fourth diagonal support member, each extending from the second cross member at a location near the second coupling assembly to the fourth cross member, such that the third and fourth diagonal support members are connected to the second cross member at an angle sufficient to substantially direct forces from the second coupling assembly to the fourth cross member and the first and second side drive plates.

6. The support frame of claim 1, wherein the coupling assembly is a single point connection.

7. The support frame of claim 1, wherein the coupling assembly includes parallel blades, each blade forming an aperture therethrough, wherein the parallel blades are further adapted for accommodating a complementary blade from a compatible coupling assembly of the subsequent rail car therebetween.

8. The support frame of claim 1, wherein the wheel mounting structures are mounted to a surface of the side plate which does not frictionally contact the drive tire.

9. The support frame of claim 1, wherein the wheel mounting structures are adapted to accommodate a wheel hub assembly.

10. The support frame of claim 9, wherein the wheel hub assembly includes a bearing having a self-contained assembly.

11. The support frame of claim 9, wherein one wheel hub assembly rotates an associated wheel independently from another wheel at another wheel hub assembly.

12. The support frame of claim 1, wherein an area is formed and bounded by the first side drive plate, the second side drive plate, the third cross member and the fourth cross member, and wherein the formed area is adapted to accommodate passing of a curved rail thereby allowing for a tight vertical turn radius by the rail car.

13. The support frame of claim 2, wherein the first diagonal support member and the second diagonal support member each extend from the first cross member at an angle of about 45°.

14. The support frame of claim 2, wherein the first cross member is integral with the first and second diagonal support members.

15. The support frame of claim 2, wherein the first and third cross members are integral with the first and second diagonal support members.

16. The support frame of claim 1, wherein at least a portion of the support frame is formed from upper and lower sheets having cut out sections.

17. A rail car, operable in a rail transport system including at least one drive station having a drive tire adapted to impart a driven moment to the rail car for conveying bulk materials on a rail, said rail car comprising a support frame according to claim 1 and a container for bulk materials connected to the support frame.

18. The rail car of claim 17, wherein the container for bulk materials is in the form of a substantially continuous trough, and wherein the container for bulk materials comprises a chute projecting from one end, the chute being configured for overlapping with a trough of a subsequent rail car to prevent spillage therebetween.

19. The rail car of claim 17, wherein the container for bulk materials is hingedly joined to the support frame to allow for side-dumping of bulk materials from the rail car.

20. A train, comprising front and rear rail cars, and one or more intermediate rail cars coupled therebetween, or front and rear rail cars without one or more intermediate rail cars coupled therebetween, wherein said rail cars are rail cars according to claim 17.

\* \* \* \* \*